(12) United States Patent
Yanagida et al.

(10) Patent No.: US 11,099,015 B2
(45) Date of Patent: Aug. 24, 2021

(54) MANAGEMENT SYSTEM OF SUBSTITUTE PARKING SERVICE, METHOD OF ASSISTING USE OF SUBSTITUTE PARKING SERVICE, AND NON-TRANSITORY COMPUTER-READABLE STORAGE MEDIUM STORING MANAGEMENT PROGRAMS

(71) Applicant: TOYOTA JIDOSHA KABUSHIKI KAISHA, Toyota (JP)

(72) Inventors: Tohru Yanagida, Nagoya (JP); Chikage Kubo, Choufu (JP); Ai Fujimura, Toyota (JP); Shunsuke Noda, Kakamigahara (JP); Satoshi Usui, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 345 days.

(21) Appl. No.: 16/214,606

(22) Filed: Dec. 10, 2018

(65) Prior Publication Data
US 2019/0195640 A1  Jun. 27, 2019

(30) Foreign Application Priority Data
Dec. 21, 2017  (JP) .............................. JP2017-244932

(51) Int. Cl.
| | |
|---|---|
| *G01C 21/34* | (2006.01) |
| *G08G 1/14* | (2006.01) |
| *G08G 1/00* | (2006.01) |
| *G06Q 50/30* | (2012.01) |
| *G01C 21/36* | (2006.01) |

(52) U.S. Cl.
CPC ..... *G01C 21/3407* (2013.01); *G01C 21/3461* (2013.01); *G01C 21/3469* (2013.01); *G08G 1/144* (2013.01); *G08G 1/205* (2013.01); *G08G 1/207* (2013.01); *G01C 21/3626* (2013.01);
(Continued)

(58) Field of Classification Search
CPC ............ G01C 21/3407; G01C 21/3461; G01C 21/3469; G01C 21/3685; G01C 21/3626; G08G 1/144; G08G 1/207; G08G 1/205; G06Q 50/30
See application file for complete search history.

(56) References Cited

U.S. PATENT DOCUMENTS

| | | | |
|---|---|---|---|
| 10,156,848 B1 * | 12/2018 | Konrardy et al. . | G01C 21/3461 |
| 2011/0161138 A1 * | 6/2011 | Keaveny et al. ...... | G06Q 10/06 705/7.38 |

(Continued)

FOREIGN PATENT DOCUMENTS

| | | |
|---|---|---|
| CN | 106408701 A | 2/2017 |
| JP | 2006-209429 | 8/2006 |

*Primary Examiner* — Dale W Hilgendorf
(74) *Attorney, Agent, or Firm* — Oblon, McClelland, Maier & Neustadt, L.L.P.

(57) ABSTRACT

A management system that manages substitute parking service in which a substitute driver parks a vehicle of a service user, in place of the service user, includes a processor configured to generate path information indicating a path from a delivery location of the vehicle to a parking lot in which the vehicle is allowed to be parked, based on information indicating the delivery location, and information indicating a position of the parking lot, and the processor being configured to transmit the path information to a terminal of the service user.

15 Claims, 12 Drawing Sheets

(52) U.S. Cl.
CPC ......... *G01C 21/3685* (2013.01); *G06Q 50/30* (2013.01)

(56) References Cited

U.S. PATENT DOCUMENTS

| | | | |
|---|---|---|---|
| 2012/0092190 A1* | 4/2012 | Stefik etal ............... | G06Q 50/30 340/932.2 |
| 2012/0188100 A1* | 7/2012 | Min et al. ............... | G08G 1/144 340/932.2 |
| 2013/0231824 A1* | 9/2013 | Wilson et al. ..... | G01C 21/3415 701/26 |
| 2014/0278081 A1* | 9/2014 | Iwuchukwu ....... | G01C 21/3685 701/519 |
| 2014/0343851 A1* | 11/2014 | Michael ............. | G01C 21/3461 701/538 |
| 2017/0191848 A1* | 7/2017 | Jones ................. | G01C 21/3685 |
| 2017/0316254 A1* | 11/2017 | Hariri et al. ........ | G06K 9/00255 |
| 2017/0356749 A1* | 12/2017 | Shelby et al. ..... | G01C 21/3407 |
| 2018/0373249 A1* | 12/2018 | Choi ................... | G01C 21/3685 |

\* cited by examiner

FIG. 4

USER DB    416

| PERSONAL INFORMATION | | | | VEHICLE INFORMATION | | | |
|---|---|---|---|---|---|---|---|
| USER ID | NAME | CONTACT | USER TERMINAL INFORMATION | VEHICLE TYPE | VEHICLE NUMBER | COLOR | KEY UNIT INFORMATION |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |

| SERVICE-USE-RELATED INFORMATION | | | | RELEVANCE | |
|---|---|---|---|---|---|
| DATE AND TIME OF USE | DELIVERY LOCATION | PARKING LOT SELECTION CONDITIONS | PATH SELECTION CONDITIONS | SUBSTITUTE DRIVER ID | PARKING LOT ID |
|  |  |  |  |  |  |
|  |  |  |  |  |  |
|  |  |  |  |  |  |
|  |  |  |  |  |  |
|  |  |  |  |  |  |
|  |  |  |  |  |  |

FIG. 5

SUBSTITUTE DB    417

| PERSONAL INFORMATION | | | | STATUS | | | | RELEVANCE | |
|---|---|---|---|---|---|---|---|---|---|
| SUBSTITUTE DRIVER ID | NAME | CONTACT | SUBSTITUTE TERMINAL INFORMATION | AVAILABILITY | AREA OF PRESENCE | POSITION INFORMATION | MOVING SPEED | USER ID | PARKING LOT ID |
|  |  |  |  |  |  |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |

PARKING LOT DB

| PARKING LOT ID | NAME | LOCATION (POSITION INFORMATION) | CONTACT | SPECIFI-CATIONS | PARKING FEE | USER ID | SUBSTITUTE DRIVER ID |
|---|---|---|---|---|---|---|---|
| | | | | | | | |
| | | | | | | | |
| | | | | | | | |
| | | | | | | | |
| | | | | | | | |
| | | | | | | | |

418

MANAGEMENT SYSTEM OF SUBSTITUTE PARKING SERVICE, METHOD OF ASSISTING USE OF SUBSTITUTE PARKING SERVICE, AND NON-TRANSITORY COMPUTER-READABLE STORAGE MEDIUM STORING MANAGEMENT PROGRAMS

INCORPORATION BY REFERENCE

The disclosure of Japanese Patent Application No. 2017-244932 filed on Dec. 21, 2017 including the specification, drawings and abstract is incorporated herein by reference in its entirety.

BACKGROUND

1. Technical Field

The present disclosure relates to a management system of substitute parking service, a method of assisting use of the substitute parking service, and a non-transitory computer-readable storage medium storing a management program.

2. Description of Related Art

When a driver drives a vehicle to visit a certain place (such as a shop, shopping mall, or event site), for shopping, or attending or viewing an event, for example, and finds that a parking lot at the place visited is full, the driver may wait while driving the vehicle, in a waiting line for parking, until a parking space in an empty state (which will be called "empty space") appears. Also, even when the driver tries to find an empty space while driving slowly in the parking lot, the driver may not be able to easily find any empty space, and may let another vehicle parked first in a space missed by the driver. In some cases, the driver may give up using the parking lot of the place visited, and park the vehicle in another parking lot in the vicinity of or around the place visited. Thus, not a small number of drivers think searching for a parking lot or parking space, or waiting for appearance of an empty space, as a waste of time.

In the related art, there is a parking guidance navigation system that guides a vehicle to an empty parking space when the empty space appears while the driver is looking for one (see, for example, Japanese Patent Application Publication No. 2006-209429 A (JP 2006-209429 A)).

SUMMARY

According to the related art, the length of time it takes from the time when the empty space appears to the time when the vehicle is parked in the space can be shortened. However, the driver has to continue to drive the vehicle, until the empty space appears, and the driver moves the vehicle to the space and completes parking. Thus, it may be proposed to use substitute parking service that has a substitute driver park the vehicle, in place of the driver. The service user (e.g., the original driver who owns the vehicle) stops the vehicle at a delivery location. Then, the substitute driver goes to the delivery location of the vehicle, and is temporarily allowed to operate the vehicle, so as to move the vehicle to a parking lot and park it there.

In the process of promoting and spreading the use of the substitute parking service as described above, the following problem is encountered. For example, a service provider is assumed to present a parking lot in which the vehicle is to be parked, and its position, to the service user. In this case, even if the service user can approve of the parking lot and its position, it is unclear what path the substitute driver will take when he/she drivers the vehicle to the parking lot. Thus, the service user may be concerned about a possible waste of fuel or electric power, and may not conclude an agreement on the use of the service, or may be discouraged from repeatedly using the service.

This disclosure provides a management system of substitute parking service which can give a sense of reassurance about the substitute parking service, to a service user, a method of assisting the use of the substitute parking service, and programs.

The disclosure provides substitute parking service in which a substitute driver parks a vehicle of a service user, in place of the service user, in which information indicating a path along which the vehicle to be traveled from a delivery location of the vehicle of the service user to a parking lot is supplied to a terminal of the service user.

A management system according to a first aspect of the disclosure manages substitute parking service in which a substitute driver parks a vehicle of a service user, in place of the service user. The management system includes a processor configured to generate, based on delivery location information indicating a delivery location at which the vehicle is delivered to the substitute driver, and parking lot information indicating a position of a parking lot in which the vehicle is allowed to be parked, path information indicating a path along which the vehicle to be traveled from the delivery location of the vehicle to the parking lot, and the processor being configured to transmit the path information to a terminal of the service user.

With the management system according to the first aspect of the disclosure, the path information indicating the path from the delivery location to the parking lot is generated, and transmitted to the terminal of the service user. The service user can be informed of the path along which the substitute driver moves the vehicle, by referring to the path displayed on the terminal, and can recognize that the substitute driver will not pass a path unnecessary for travel of the vehicle to the parking lot, and will not waste fuel. Thus, the service user is provided with a sense of reassurance, and can easily make a decision on the use of the service. Also, where the service user has already concluded an agreement on the use of the service, the user can recognize, by referring to the path, that the service will be done in such a manner as not to impose a useless burden on the user, and can also be provided with a sense of reassurance. As described above, the path information may be provided before or after the agreement concerning the use of the substitute parking service is concluded. In this specification, the term "service user" refers to both a person who is going to use substitute parking service, and a person who has concluded the agreement and receives the actual service.

In the management system according to the first aspect of the disclosure, the path information may be transmitted when the path indicated by the path information does not satisfy a path selection condition set by the service user. Namely, when the path satisfies the path selection condition set in advance by the user, the path information is not transmitted to the terminal, so that the procedure is simplified. However, even when the path selection condition is satisfied, the path information may be transmitted, so as to ask the service user to check the path.

For example, the path selection condition may include a distance from the delivery location to the parking lot, which is acceptable to the service user. The path selection condition may include an amount of energy consumption of the vehicle required for movement from the delivery location to the parking lot, which amount is acceptable to the service user. The amount of energy consumption is the amount of consumption of fuel, such as gasoline, light oil, or hydrogen, or the amount of consumption of electric power from a secondary battery. The amount of energy consumption may be represented by the amount of consumption of fuel or electric power, or may be represented by an amount of money into which the consumption amount of the fuel or power is converted. The path selection condition may be a combination of the above conditions. The path selection condition is not limited to those as described above, but a condition(s) other than those as described above may be used.

In the management system, the processor may be configured to issue a specific benefit to the service user, when an approval of the path that does not satisfy the path selection condition is received from the terminal of the service user. According to the management of this aspect, it may be possible to reduce a complaint of the service user who has to use the path against his/her intention. The specific benefit includes a coupon, point, or the like, which can be used for purchase of certain goods or use of service. However, the specific benefit may be other than coupons and points.

In the management system according to the first aspect of the disclosure, the processor may be configured to select a parking lot that satisfies a parking lot selection condition set by the service user, from parking lots in which the vehicle is allowed to be parked. The processor may be configured to use information indicating a position of the parking lot selected by processor, as the parking lot information indicating the position of the parking lot, to generate the path information. For example, the parking selection condition may include a distance from the delivery location, parking fee acceptable to the service user, specifications of the parking lot desired by the service user, and so forth. The specifications of the parking lot may include the type (flat or multilevel) of the parking lot or facility, the size of a parking space of the parking lot, the presence or absence of door open/close space, the required height of the parking space, and so forth, and at least one may be selected from these specifications. With the parking lot selection condition thus employed, the parking lot permitted or desired by the service user is selected, so that the service user has an enhanced sense of satisfaction with the use of the service.

In the management system according to the first aspect of the disclosure, the processor may be configured to send candidate path information indicating a plurality of candidate paths from the delivery location to the parking lot, and cost information indicating a cost involved in each of the candidate paths, to the terminal of the service user, and receive path information indicating a path selected by the service user from the candidate paths. As described above, the path information of the path selected based on the path selection condition may be transmitted. However, when two or more candidate paths are presented to the service user, and the service user selects one of the candidate paths, the path desired by the service user can be used for provision of the substitute parking service. The two or more candidate paths may be selected based on the parking lot selection condition and path selection condition, or may be selected based on a predetermined condition different from these selection conditions. The candidate paths may be two or more paths between the delivery location and one parking lot, or may be two or more paths between the delivery location and respective ones of two or more parking lots. Two or more paths may be indicated as candidates with respect to each of the two or more parking lots.

For example, the information indicating the cost involved in each of the candidate paths includes a distance from the delivery location to the parking lot, parking fee, and an amount of energy consumption required for travel of the vehicle from the delivery location to the parking lot, with regard to each of the candidate paths. At least one of the distance, parking fee, and the amount of energy consumption may be used. However, the cost may include an information element or elements (parameter(s)) other than those illustrated above.

A second aspect of the disclosure is concerned with a method of assisting use of substitute parking service in which a substitute driver parks a vehicle of a service user, in place of the service user. The method includes the steps of: generating path information indicating a path along which the vehicle to be traveled from a delivery location at which the vehicle is delivered to the substitute driver to a parking lot in which the vehicle is allowed to be parked, based on delivery location information indicating the delivery location, and parking lot information indicating a position of the parking lot, and transmitting the path information to a terminal of the service user.

A third aspect of the disclosure is concerned with a non-transitory computer-readable storage medium storing a management program for use in a computer of a system that manages substitute parking service in which a substitute driver parks a vehicle of a service user, in place of the service user. The program causes the computer to execute the steps of: generating path information indicating a path along which the vehicle to be traveled from a delivery location at which the vehicle is delivered to the substitute driver to a parking lot in which the vehicle is allowed to be parked, based on delivery location information indicating the delivery location, and parking lot information indicating a position of the parking lot, and transmitting the path information to a terminal of the service user.

A fourth aspect of the disclosure is concerned with a non-transitory computer-readable storage medium storing a management program for use in a computer of a terminal of a service user who uses substitute parking service in which a substitute driver parks a vehicle of the service user, in place of the service user. The program causes the computer to execute the steps of: obtaining path information indicating a path along which the vehicle to be traveled from a delivery location at which the vehicle is delivered to the substitute driver to a parking lot in which the vehicle is allowed to be parked, from a management system that manages the substitute parking service, and presenting the path information to the service user.

A fifth aspect of the disclosure is concerned with a method of assisting use of substitute parking service in which a substitute driver parks a vehicle of a service user, in place of the service user. The method includes the steps of: causing a terminal of the service user to obtain path information indicating a path along which the vehicle to be traveled from a delivery location at which the vehicle is delivered to the substitute driver to a parking lot in which the vehicle is allowed to be parked, from a management system that manages the substitute parking service, and presenting the path information to the service user.

According to the disclosure, the service user can be provided with a sense of reassurance about the substitute parking service.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 shows an example of the data structure of a user database (user DB);

FIG. 5 shows an example of the data structure of a substitute database (substitute DB);

DETAILED DESCRIPTION OF EMBODIMENTS

Figure 1:
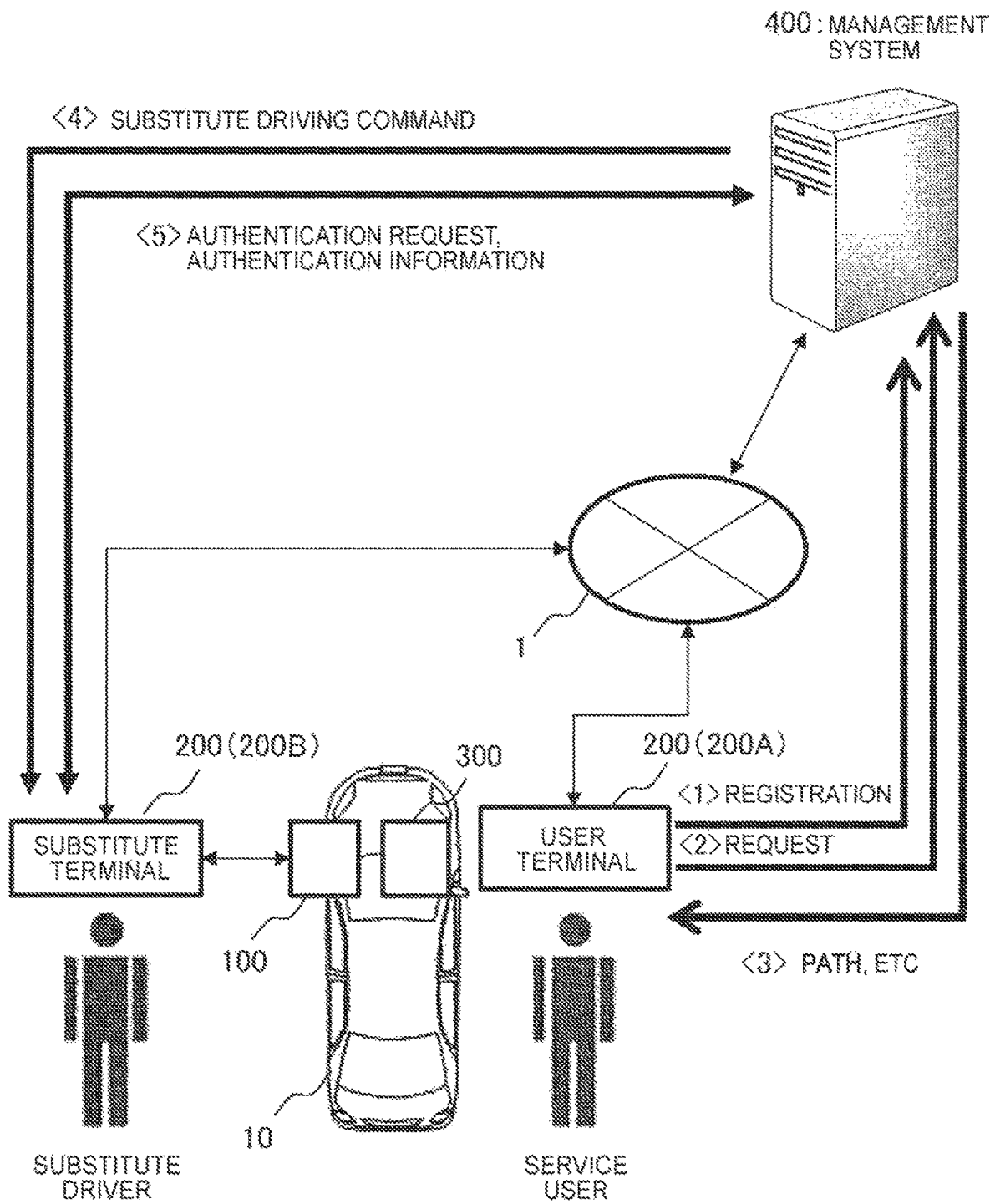
FIG. 1 is a view schematically showing a system of substitute parking service according to one embodiment.

Referring to the drawings, a management system of substitute parking service according to one embodiment, a method of assisting the use of the service, and programs will be described. The configuration of the embodiment is illustrated as an example, and the disclosure is not limited to the configuration of the embodiment.

System Configuration

FIG. 1 schematically shows a system of substitute parking service according to this embodiment. In FIG. 1, the system includes a user terminal 200A, substitute terminal 200B, and management system 400, which are connected to a network 1. For example, the network 1 is a communication network, such as the Internet, and may employ a wide area network (WAN) or other communication network. Also, the network 1 may include a cellular network, such as LTE (Long Term Evolution), and a wireless network, such as wireless LAN (Local Area Network) including Wi-Fi.

The user terminal 200A is a terminal device of a service user who uses substitute parking service, and corresponds to the "terminal of the service user". The user terminal 200A may be a mobile terminal (a communication terminal having portability), such as a smart device, like a feature phone, smartphone, or a tablet terminal, Personal Digital Assistant (PDA), or a wearable computer, for example, or may be a vehicle-mounted terminal installed on a vehicle 10 of the service user.

The substitute terminal 200B is a terminal device of a substitute driver who parks the vehicle 10 of the service user, in place of the user, and corresponds to the "terminal of the substitute driver". The substitute terminal 200B may also be a mobile terminal similar to the user terminal 200A, or a vehicle-mounted terminal. In sum, the user terminal 200A and the substitute terminal 200B are only required to be movable, and able to communicate with the management system 400 via the network 1, and may be a device other than the mobile terminal and vehicle-mounted terminal as described above provided that the requirements are met. In this embodiment, the case where the user terminal 200A and the substitute terminal 200B are mobile terminals will be described as one example. A mobile terminal that may be either the user terminal 200A or the substitute terminal 200B will be denoted as "mobile terminal 200".

The vehicle 10 has a smart key system including a locking/unlocking device 300 and a key unit 100. The locking/unlocking device 300 gives a unique ID to a mobile device (called "electronic key") that performs wireless communications with the vehicle 10, and permits unlocking of a door and starting of the engine when the ID obtained through communications with the mobile device coincides with an ID registered in advance in the vehicle 10. The key unit 100 is a device that permits locking and unlocking of the vehicle 10 using the mobile terminal 200 in place of the electronic key, without altering the vehicle 10. The key unit 100 is placed at a given position (e.g., in a glove box) within the vehicle 10, and is supplied with electric power from a battery or secondary battery of the vehicle 10. When the key unit 100 obtains enablement data (data that temporarily permit operation of the vehicle 10, such as unlocking of the vehicle 10 and starting of the engine) for enabling operation of the vehicle from the mobile terminal 200, the key unit 100 behaves like the electronic key, and permits unlocking of the door and starting of the engine, for example. The "enablement data" may be data (i.e., a program) that can be implemented by a computer, or data that cannot be implemented. The "enablement data" may be data for proving that the person who carries the mobile terminal 200 is the person permitted to operate the vehicle, or data for activating a device or program used for operation of the vehicle, or a program itself used for operation of the vehicle, or other data. In this embodiment, the enablement data is authentication information that is used by the key unit 100 for authentication of the substitute terminal 200B, and also brings the vehicle 10 into a state where it can be operated by the substitute driver when the substitute terminal 200B is successfully authenticated.

The management system 400 corresponds to the "management system of substitute parking service". The management system 400 is managed by an operator (service provider) of the substitute parking service, for example. The management system 400 performs management of information (user information) about service users, information (substitute information) about substitute drivers, and parking lot information, user registration processing, processing for accepting requests for use of service, calculation of a path from a delivery location of the vehicle 10 to a parking lot, and presentation of the path to the service user concerned. The management system 400 also operates as an issuance device that issues authentication information that permits operation of the vehicle 10 using the substitute terminal 200B.

Flow of Substitute Parking Service

Referring to FIG. 1, the flow of the substitute parking service will be described. A person who wishes to use substitute parking service accesses the management device 400 using the user terminal 200A, and performs a user registration process so as to become a member (service user) of the substitute parking service (<1> in FIG. 1). Then, the service user operates the user terminal 200A when he/she asks for provision of the substitute parking service, and accesses the management device 400 so as to apply for use of the service (<2> in FIG. 1). In the application, information (such as the date and time of use, delivery location, parking lot, service fee, shared payment of parking fee, etc.) associated with an agreement on implementation of substitute parking service is transmitted between the management device 400 and the user terminal 200A. During the mutual transmission, information indicating a path or paths from the delivery location to the parking lot is provided (transmitted) as needed from the management device 400 to the user terminal 200A (<3> in FIG. 1).

Once the agreement on implementation of substitute parking service is concluded, as a result of the mutual transmission, a substitute driver who will park the vehicle is selected. In this embodiment, the substitute driver may be automatically selected by the management system 400, or may be manually selected. The management system 400 sends a substitute driving command including the delivery location and information of the vehicle 10, to the substitute terminal 200B of the selected substitute driver (<4> in FIG. 1). The selected substitute driver goes to the delivery location of the vehicle 10 according to the substitute driving command, and the vehicle 10 is handed over to the substitute driver.

Upon delivery of the vehicle 10, operation to enable the substitute driver to operate the vehicle 10 is performed. Namely, the substitute terminal 200B receives authentication information that permits operation of the vehicle 10, from the management device 400 (<5> in FIG. 1), and supplies the authentication information to the key unit 100 of the vehicle 10. With the authentication information thus supplied, the key unit 100 behaves like an electronic key in a smart key system, and the substitute driver becomes able to unlock the vehicle 10, start the engine, and drive the vehicle 10. Thus, in the substitute parking service according to this embodiment, the service user is not required to hand over the electronic key to the substitute driver, and therefore, need not be present at the delivery location. The substitute driver drives the vehicle 10, to move the vehicle 10 to a parking lot where the vehicle 10 is to be parked, and park the vehicle 10 there. When parking is completed, the substitute driver ceases to be enabled to operate the vehicle 10, through invalidation of the authentication information, for example. Afterward, the service user goes to the parking lot where the vehicle 10 is parked, and picks up the vehicle 10.

Configuration of Mobile Terminal

Figure 2:
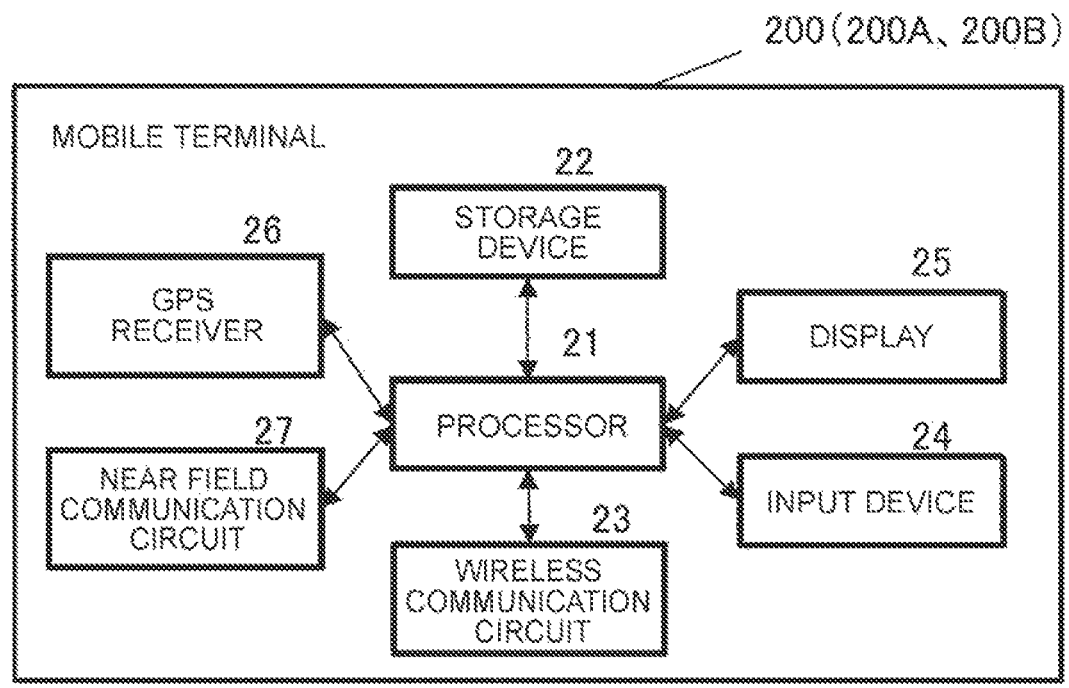
FIG. 2 shows an example of the configuration of a terminal that can be used as a terminal of a service user or a terminal of a substitute driver.

In the following, each of the devices that realize the substitute parking service will be described in detail. FIG. 2 shows an example of the configuration of the mobile terminal 200 that can be used as the user terminal 200A or the substitute terminal 200B. The mobile terminal 200 includes a processor 21, storage device 22, wireless communication circuit 23, input device 24, display 25, GPS (Global Positioning System) receiver 26, and near field communication circuit 27.

The storage device 22 includes a main storage device and an auxiliary storage device. The main storage device is used as a storage area for programs and data, development area for programs, work area for programs, and buffer area for communication data, for example. The main storage device is provided by a random access memory (RAM), or a combination of RAM and a read-only memory (ROM). The auxiliary storage device is used as a storage area for data and programs. The auxiliary storage device is selected from, for example, a hard disc, solid state drive (SSD), flash memory, and a non-transitory computer-readable storage medium, such as an EEPROM (Electrically Erasable Programmable Read-Only Memory).

The wireless communication circuit 23 governs wireless communications according to a wireless communication system (such as LTE, or wireless LAN (Wi-Fi)) supported by the mobile terminal 200. The input device 24 includes keys, buttons, pointing device, touch panel, etc., and is used for entry of information. The display 25 is a liquid crystal display, for example, and displays information and data. The GPS receiver receives a signal from a GPS satellite, and calculates the position of the mobile terminal 200. The near field communication circuit 27 governs near field communications according to certain near field communication standards (such as NFC (Near Field Communication), BLE (Bluetooth (registered trademark) Low Energy), UWB (Ultra Wide Band), and ZIGBEE™).

The processor 21 is a central processing unit (CPU), for example, and executes various programs stored in the storage device 22, thereby to cause the mobile terminal 200 to operate as the user terminal 200A or the substitute terminal 200B.

Configuration of Management System

Figure 3:
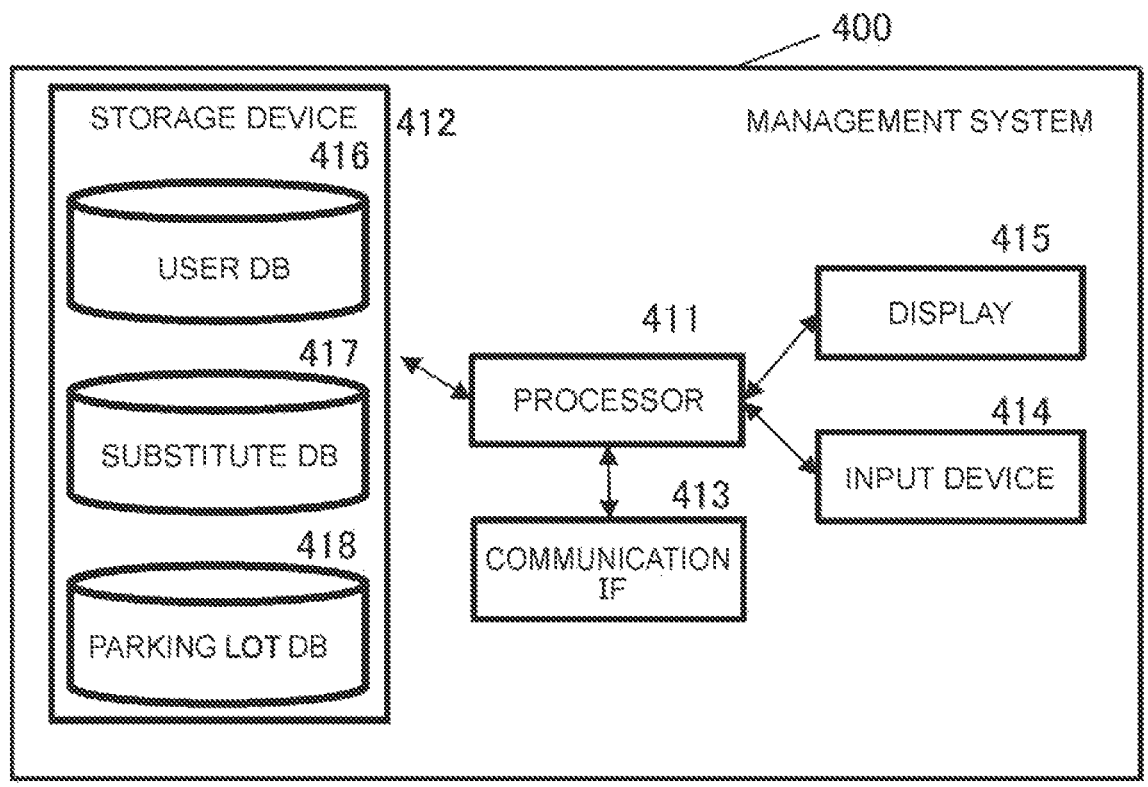
FIG. 3 shows an example of the configuration of a management system.

FIG. 3 shows an example of the configuration of the management system 400. The management system 400 is a general-purpose information processing device, such as a personal computer, or a work station, or a dedicated information processing device, such as a server machine. The management system 400 includes a processor 411, storage device 412, communication interface (communication IF) 413, input device 414, and display 415.

Those similar to the processor 21, storage device 22, input device 24, and display 25 as described above may be used as the processor 411, storage unit 412, input device 414, and display 415. However, those having different performance or capabilities from those used in the mobile terminal 200 may be used, depending on differences in the use and the purpose of use.

The communication IF 413 governs communication processing. As the communication IF 413, a network interface card (NIC) may be used, for example. The communication IF 413 sends and receives data and information to and from the user terminal 200A and the substitute terminal 200B, via the network 1. The processor 411 executes various programs stored in the storage device 412, so that the management system 400 operates as a device for managing the substitute parking service and a device for issuing authentication information.

At least a part of the processing performed by the processor 21 and the processor 411 may be carried out by a processor, such as DSP (Digital Signal Processor) or GPU (Graphics Processing Unit), other than the CPU, or by a dedicated or general integrated circuit, such as ASIC (Application Specific Integrated Circuit) or FPGA (Field Programmable Gate Array), or a combination of the processor and the integrated circuit. The combination may be called microcontroller (MCU), SoC (System-on-a-Chip), system LSI (Large-Scale Integration), or chip set, for example.

Description of Database (DB)

In the storage device 412, a user database (user DB) 416, substitute database (substitute DB) 417, and parking lot database (parking lot DB) 418 are stored, as one example.

The user DB 416 stores user information. FIG. 4 shows an example of the data structure of the user DB 416. In the user DB 416, personal information of each service user, vehicle information, key unit information, and service-use-related information are stored, in association with a user ID as identification information of the service user. The user ID may be unique information among users. The personal information includes the name of the service user, contact information (the address, phone number, mail address, etc.), user terminal information, and so forth. The user terminal information is information used when the management system 400 communicates with the user terminal 200A, and includes the IP (internet Protocol) address or MAC (Media Access Control) address of the user terminal 200A, for example. The personal information may further include information other than the ones illustrated above. The personal information is stored when the user is registered, for example, but may be stored at other times.

The vehicle information includes information for visually specifying the vehicle 10. For example, the vehicle information includes the vehicle type, vehicle number (automobile registration number plate), color (e.g., coating color, or body color) of the vehicle, and so forth. The vehicle information may further include characteristics that help the substitute driver find the vehicle 10, in addition to those as indicated above. For example, the information indicating such characteristics may include information that contributes to identification of the vehicle 10, and includes the presence of optional parts (e.g., a roof carrier, roof box, spare tire, etc.), the presence of special painting (use of two or more tones, drawing of an image), attachment of a sticker, and so forth. The vehicle information is stored in the user DB 416 when the user applies for the use of the service, for example. However, the vehicle information may be stored at the time of user registration. The registration of the vehicle information is optional.

The key unit information is information concerning the key unit 100 placed in the vehicle 10, and is used for issuing authentication information that matches the key unit 100. In this embodiment, the personal information and vehicle information as indicated above are registered by the service user. However, a part or all of these items of information may be registered by a seller of the vehicle before its delivery, or in a plant where the vehicle 10 is assembled, in place of the service user.

The service-use-related information is information concerning the use of the service, and includes the date and time of use, delivery location of the vehicle 10, and so forth. The date and time of use indicates the scheduled time of delivery of the vehicle 10, for example. The date and time of use may include the scheduled time of pickup of the vehicle 10. As the service-use-related information, information indicating a parking lot selection condition or conditions desired by the service user, and information indicating a path selection condition or conditions are stored. In this embodiment, the parking lot selection conditions indicate the specifications of the parking lot, which are permitted or desired by the service user. The specifications indicate the type (flat or multilevel) of the parking lot or facility, the size of each parking space of the parking lot, the presence or absence of door open/close space, the required height of the parking space, and so forth. Any one of the items indicating the above specifications may be used alone, or a combination of two or more items may be used. Each item may also be weighted. Conditions, such as a condition on the height of the parking space, which must be satisfied and otherwise the vehicle 10 is inhibited from being parked, may be set as special conditions. The parking lot selection conditions are not limited to the above specifications. Selection of a parking lot based on the parking lot selection conditions is optional, and may be omitted.

The path selection condition is a condition used for selecting one path from two or more candidate paths. The "two or more candidate paths" may be two or more paths between the delivery location and one parking lot, or may be a single path or two or more paths between the delivery location and each of two or more parking lots. The two or more candidate paths have respective costs, and the path selection condition indicate a condition for selecting one path based on the cost.

As the information indicating the cost, at least one of the distance from the delivery location to the parking lot, parking fee, value indicating the amount of consumption of energy required to move the vehicle from the delivery location to the parking lot of each candidate, is stored with regard to each of the two or more paths. The distance may be the distance or length of a straight line leading to the parking lot, or may be the traveling distance of the vehicle 10. As the parking fee, a unit fee per hour may be indicated, or an approximate value of the total fee calculated from the scheduled time period of use of the parking lot may be indicated. The amount of energy consumption is the amount of consumption of fuel, such as gasoline, light oil, or hydrogen, or the amount of power consumption of a secondary battery, and depends on the drive source of the vehicle 10. The value indicating the amount of energy consumption may be a value indicating the amount of consumption of fuel or electric power (an approximate value can be obtained from the type of the vehicle 10), or may be a value obtained by converting the amount of consumption into the amount of money. As the selection condition(s), any one of the above-indicated distance, parking fee, and amount of energy consumption may be used alone, or a combination of two or more of these conditions may be used. Also, weighting (setting of priorities) may be performed on the distance, parking fee, and specifications. Further, in the user DB 416, the substitute driver ID and parking lot ID associated with the user ID of the service user can be registered, as information indicating the relevance (correspondence relationship) between the service user, and the substitute driver and parking lot. The substitute driver ID and the parking lot ID are registered in the user DB 416 when the substitute driver ID and the parking lot ID are searched for, using the user ID. The service-use-related information may include information other than those as described above. For example, information received from the user terminal 200A and indicating the position of the vehicle 10 may be stored as the service-use-related information.

FIG. 5 shows an example of the data structure of the substitute DB 417. In the substitute DB 417, personal information of each substitute driver and status information are stored in association with a substitute ID as identification information of the substitute driver, for example. The substitute ID may be unique information among substitute drivers. The personal information of the substitute driver includes the name of the substitute driver, contact information (e.g., the address, phone number, mail address, etc.) on the substitute driver, and substitute terminal information. The contact information of the substitute driver is used for individual contact with the substitute driver. The substitute terminal information includes identification information of the substitute terminal 200B, for example, the IP address or MAC address of the substitute terminal 200B, and is used for communications between the management system 400 and the substitute terminal 200B.

The status information includes at least one of the availability of the substitute driver, the area of his/her presence, position information, and moving speed. However, the status information may include further items of information. The availability is information indicating whether each substitute driver can undertake substitute parking. The availability is set to "not available (NG)" when the substitute driver is off-duty or has already been dispatched, and is set to "available (OK)" otherwise. The area of presence indicates a geographic area in which the substitute driver (substitute terminal 200B) is currently located. The geometric area may be an administrative area or district, or may be an area defined by the operator according to a suitable rule, or may be within a circle of a given radius, which has a center at the position of the substitute terminal 200B. The position information indicates position information of the substitute terminal 200B. The moving speed indicates the average moving speed of the substitute driver obtained from the position information. The number of samples used for calculation of the average moving speed can be selected as appropriate. The area of presence, position information, and moving speed are used for choosing a fewer candidates from candidate substitute drivers. However, selection of the substitute driver using the status information is optional. Further, in the substitute DB 417, the user ID and parking lot ID associated with the substitute driver ID of the substitute driver can be registered, as information indicating the relevance (correspondence relationship) between the substitute driver, and the service user and the parking lot. The user ID and the parking lot ID are registered in the substitute DB 417 when the user ID and the parking lot ID are searched for, using the substitute driver ID.

Figures 6, 7:
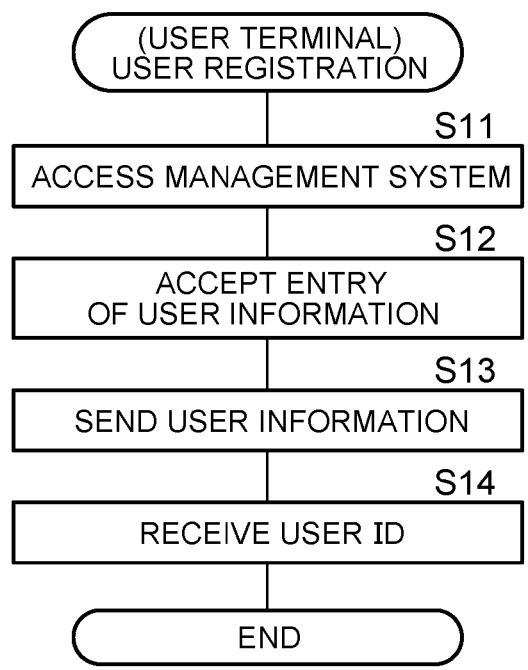
FIG. 6 shows an example of the data structure of a parking lot database (parking lot DB)
FIG. 7 is a flowchart illustrating flow of processing at the time of user registration on a user terminal.

FIG. 6 shows an example of the data structure of the parking lot DB 418. The parking lot DB 418 stores, in association with the parking lot ID as a unique ID provided for each parking lot, the name of the parking lot, location (position information) of the parking lot, contact information of the administrator of the parking lot, information (specifications information) indicating the above-indicated specifications of the parking lot, and information indicating the parking fee. However, all of these items of information are not entirely essential, and information other than these items may be stored. Further, in the parking lot DB 418, the user ID and the substitute driver ID associated with the parking lot ID of the parking lot can be registered, as information indicating relevance (correspondence relationship) between the parking lot, and the substitute driver and the service user. The user ID and the substitute driver ID are registered in the parking lot DB 418 when the user ID and the substitute driver ID are searched for, using the parking lot ID.

Example of Operation Upon User Registration

Figure 8:
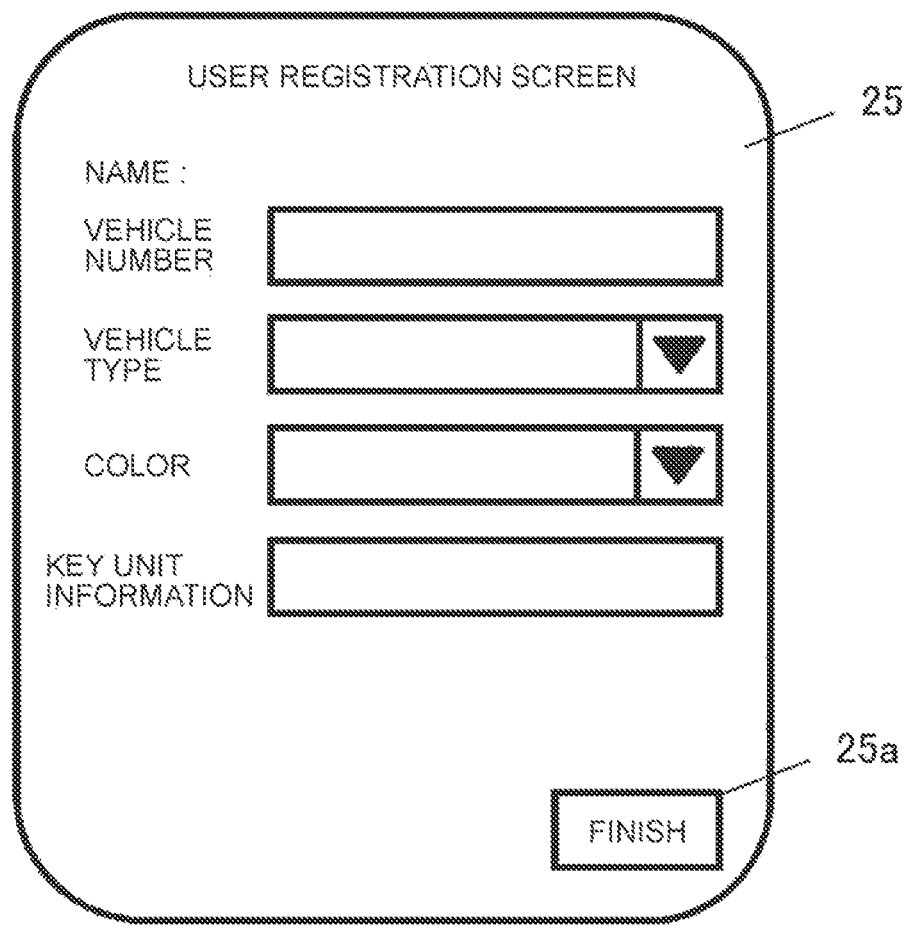
FIG. 8 shows an example of a new registration screen.
Figure 9:
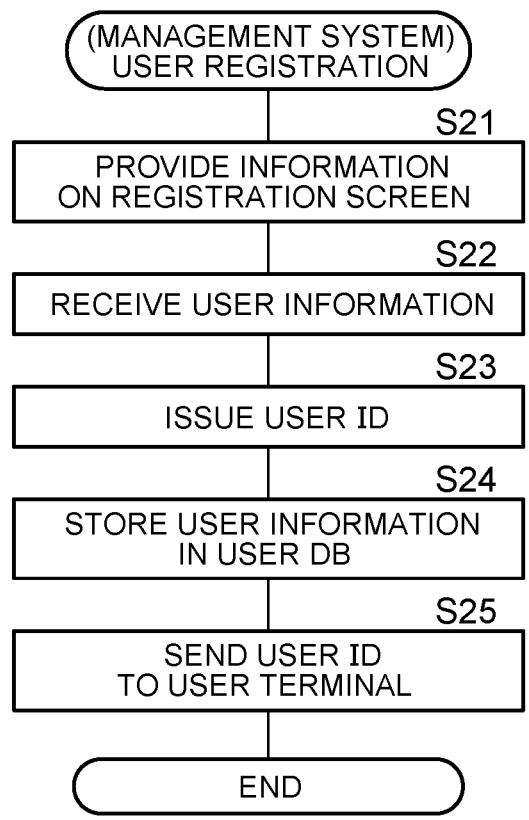
FIG. 9 is a flowchart illustrating flow of processing at the time of user registration on the management system.

Next, an example of operation of the user terminal 200A and the management system 400 at the time of user registration of a service user (at the time of new registration, <1> in FIG. 1) will be described. The flowchart of FIG. 7 shows a process performed by the processor 21 (FIG. 2) of the user terminal 200A when the service user is registered using the user terminal 200A. FIG. 8 shows an example of a user registration screen. The flowchart of FIG. 9 shows a process performed by the management system 400 at the time of user registration.

As shown in FIG. 7, when a person wishes to be registered as a user, he/she accesses the management system 400 (a website (which will also be called "operation site") of the substitute parking service), using the user terminal 200A (step S11). In step S11, the user terminal 200A establishes communication session with the management system 400 via the network 1, such that information and data can be transmitted between the user terminal 200A and the management system 400, using the communication session. The management system 400 provides information on a new registration screen, in response to the access from the user terminal 200A (step S21 in FIG. 9). The user terminal 200A can display a screen (web page) based on screen information transmitted from the operation site, on the display 25, by executing a browser in a program. The screen of information from the operation site may also be displayed, using a dedicated application installed on the user terminal 200A.

As shown in FIG. 8, the user registration screen displayed on the display 25 has entry fields for personal information, such as a name, as user information, vehicle information, such as a vehicle number, vehicle type, and color, and key unit information, and the processor 21 accepts entry of each information (step S12). However, the items of information that can be entered using the user registration screen are not limited to those as indicated above, but may be selected as needed. Once necessary matters are entered into the entry fields, and a finish button 25a is pushed, the processor 21 sends the user information thus entered, to the management system 400 (step S13). When the processor 411 of the management system 400 receives the user information (step S22), it issues a user ID (step S23), and stores the user information in association with the user ID, in the user DB 416 (step S24). As user terminal information, a source IP address of packets used for transmission of the user information is registered in the user DB 416. The management system 400 sends the user ID to the user terminal 200A (step S25). The processor 21 of the user terminal 200A receives the user ID, and stores it in the storage device 22 (step S14). In this manner, user registration is completed. The user ID stored in the user terminal 200A is attached to information transmitted to the management system 400, and used for storage of the information into the corresponding record of the user DB 416.

Example of Operation Upon Request for Service

Next, an example of operation of the management system 400 at the time when the service is requested (<2> in FIG. 1) will be described. The management system 400 is operable in one of an automatic selection mode and a manual selection mode. In the automatic selection mode, the management system 400 automatically selects one path from two or more paths, based on the parking lot selection conditions and the path selection conditions, and presents the selected path to the service user. In the manual selection mode, the management system 400 presents two or more candidate paths selected based on the parking lot selection conditions and path selection conditions, to the service user, and allows the service user to select one of the paths. However, the management system 400 may be configured to operate only in either one of the automatic selection mode and the manual selection mode.

Example of Operation in Automatic Selection Mode

Figure 10:
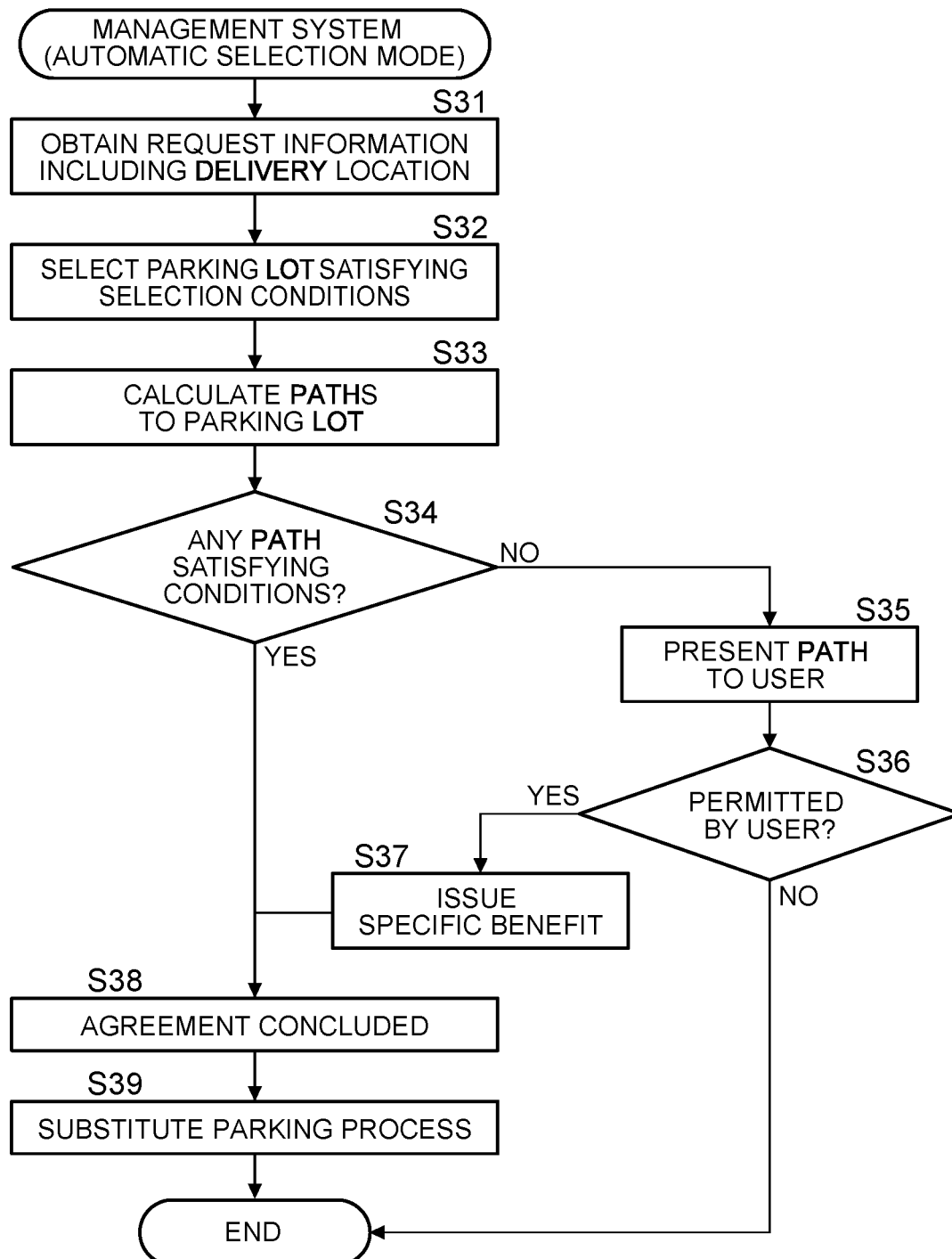
FIG. 10 is a flowchart illustrating an example of a process (in automatic selection mode) performed by the management system.

FIG. 10 shows the flow of processing of the management system 400 from a request for use of substitute parking service to a substitute parking process (output of a substitute driving command). In step S31, the processor 411 of the management device 400 obtains information on a request from a service user. Namely, when the user terminal 200A accesses the management system 400 (the operation site), and logs in by use of the user ID, the management system 400 sends information on a use request screen or form of the substitute parking service, to the user terminal 200A. The processor 21 of the user terminal 200A displays the use request screen on the display 25.

Figure 11:
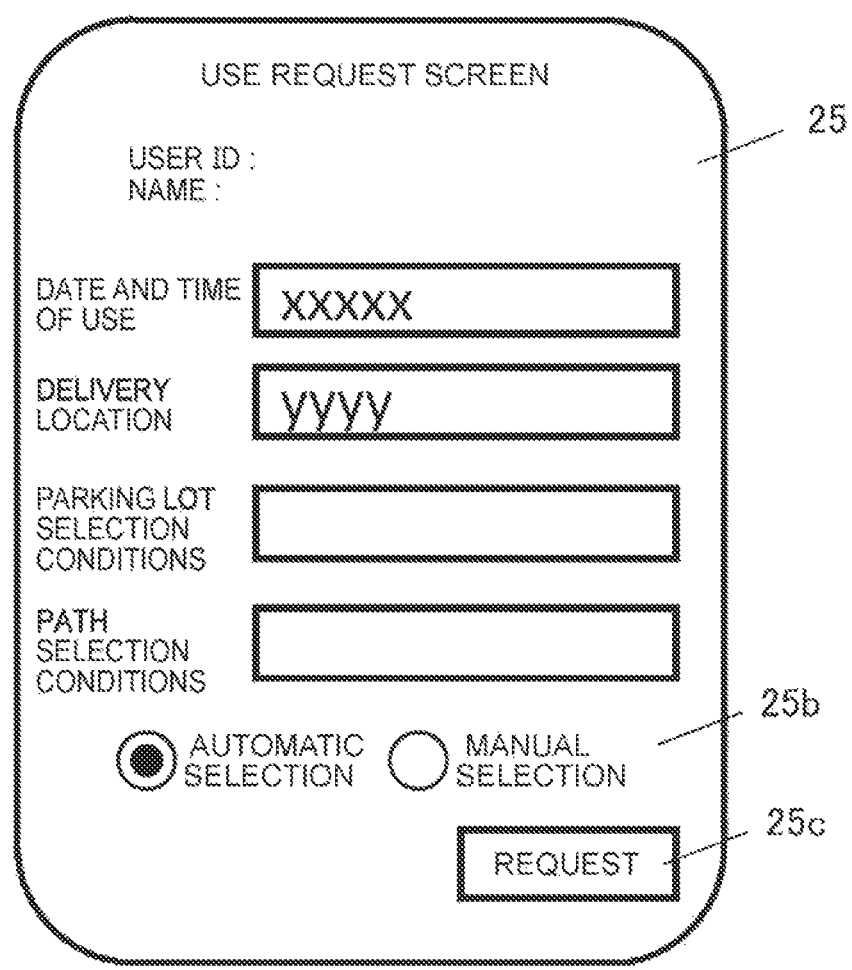
FIG. 11 shows a use request screen.

FIG. 11 shows an example of display of the use request screen. The use request screen includes respective entry fields for the date and time of use (date and time of delivery), delivery location, parking lot selection conditions, and path selection conditions, radio buttons 25*b* used for selecting one of the automatic selection mode and the manual selection mode, and a request button 25*c*. As the date and time of use, the date and time of delivery of the vehicle 10 are entered. The date and time of use may further include the scheduled pickup time of the vehicle 10. The delivery location may be information of a location where the vehicle 10 is stopped for delivery, or information indicating a point (delivery position) of stopping of the vehicle narrower than the location. When the delivery location is entered (designated), a representative point of this location is used as the delivery position.

In the entry field of the parking lot selection conditions, the content permitted or desired by the service user, with regard to the specifications of the parking lot, is entered. Also, in the entry field of the path selection conditions, conditions permitted or desired by the service user, with regard to the distance between the delivery location and the parking lot, parking fee, and the amount of energy consumption, are entered. As the entry fields of the parking lot selection conditions and the path selection conditions, on the user request screen, a plurality of choices or options provided in advance for the specifications, distance, parking fee, and the amount of energy consumption may be presented in the form of check boxes or pull-down menus, so as to allow the service user to make selections. Regarding entry of the parking lot selection conditions and path selection conditions, a menu listing "type prioritized", "size of parking space prioritized", "distance prioritized", "parking fee prioritized", and "energy consumption amount prioritized" may be displayed, instead of requesting the user to enter or select detailed conditions, and the order of priority of condition items may be set, so that the path is selected based on the top priority condition item. The radio buttons 25*b* are used for selecting one of the automatic selection mode and the manual selection mode. The request button 25*c* is a button indicating completion of entry of the request information and generating a command to send the request information.

The user enters request information, including the date and time of use (e.g., the time of delivery), delivery location, parking lot selection conditions, and path selection conditions, using the use request screen, and pushes the request button 25*c*. Then, the user terminal 200A sends the request information entered using the use request screen, to the management system 400. In this manner, the processor 411 of the management system 400 obtains the request information. The parking lot selection conditions and the path selection conditions may be entered, using the user registration screen, at the time of registration of the user.

In step S32, the processor 411 of the management system 400 selects a parking lot that satisfies the parking lot selection conditions, from a list of parking lots stored in the parking lot DB 418, using the information indicating the delivery location in the request information, and information (if entered) indicating the parking lot selection conditions. A single parking lot, or two or more parking lots, may be selected in step S32. When there is no parking lot that satisfies the parking lot selection conditions, the processor 411 selects a given number of parking lots according to a predetermined rule.

In step S33, the processor 411 of the management system 400 calculates a path from the delivery location, to each of the parking lots selected in step S32. In step S34, the processor 411 of the management system 400 determines whether there is any path that satisfies the path selection conditions set by the service user and included in the request information. The processor 411 proceeds to step S38 when it determines that there is such path, and proceeds to step S35 when there is no such path. When the parking lot selection conditions are not satisfied even though there is a path that satisfies the conditions in step S34, the processor 411 proceeds to step S35.

In step S35, the processor 411 of the management device 400 sends path information including information indicating the path from the delivery location to the parking lot, information to the effect that one or both of the parking lot selection conditions and the path selection conditions is/are not satisfied, and information of the parking lot as a destination of the path obtained from the parking lot DB 418, from the communication IF 413 to the user terminal 200A. The path information may further include information indicating the distance of the path, parking fee, and the amount of energy consumption. At this time, path information indicating information on two or more paths may be transmitted.

Upon receipt of the path information, the processor 21 of the user terminal 200A displays a screen based on the path information, on the display 25. On the screen based on the path information, the path from the delivery location to the parking lot, information on the parking lot, and information to the effect that one or both of the parking lot selection conditions and the path selection conditions is/are not satisfied, are displayed. The path may be displayed in the form of letters, or an image or video showing the path on a map, or a combination thereof. When a single path is presented, the service user enters approval or non-approval of the path, using the input device 24. When two or more paths are presented, the service user enters non-approval of all of the paths, or approval of a selected one of the paths, using the input device 24. The response including the information indicating approval or non-approval of the path is transmitted from the user terminal 200A to the management system 400. In connection with operation of the user terminal 200A, the processor 21 and the wireless communication circuit 23 operate as a means for obtaining the path information from the management system 400, and the processor 21 and the display 25 operate as a means for presenting the path information to the service user. Also, the processor 21 operates as a display control means for controlling display of the path information on the display 25 (display device). However, the path information may be provided by voice to the service user.

In step S36, the processor 411 of the management device 400 determines whether the service user permits the path that does not satisfy the conditions. When information indicating approval of the path is included in the response received from the user terminal 200A, the processor 411 determines that the service user permits the path, and proceeds to step S37. On the other hand, when information indicating non-approval of the path is included in the response, the processor 411 determines that the agreement on service use is not concluded, and finishes the process.

In step S37, the processor 411 issues a specific benefit to the service user. For example, the processor 411 generates information indicating a certain coupon or point, as a specific benefit, and sends information of the user ID and the coupon or point to an information processing unit (not shown) that manages the coupon or point, so as to ask the information processing unit to create an environment where the coupon or point can be used. Alternatively, the processor 411 may generate a code for obtaining screen information of a coupon or a point, and sends the code to the user terminal 200A, thereby to issue the coupon or point. It is, however, to be noted that the issuance of the specific benefit is optional.

In step S38, the processor 411 sends information to the effect that the agreement on the substitute parking service has been concluded, to the user terminal 200A. In step S39, the processor 411 performs a substitute parking process. In the substitute parking process, a process of automatically selecting a substitute driver, and others, are performed.

More specifically, the processor 411 of the management device 400 can automatically select the substitute driver in the following manner. For example, the processor 411 can pick out substitute drivers who are available (OK) for substitute parking, referring to the substitute DB 417, and randomly select one from the substitute drivers having the delivery location within the area of his/her presence. In another example, the processor 411 may select a substitute driver whose position indicated by the position information is spaced by a short distance from the delivery location. In a further example, the processor 411 may select a substitute driver having a high moving speed, from among the substitute drivers each having the delivery location within an area of his/her presence. The method of selecting the substitute driver can be selected as appropriate, according a predetermined selection rule using a single parameter or a combination of parameters included in the status information. The processor 411 links the substitute ID of the selected substitute driver with the user ID of the service user. The processor 411 also links the user ID of the service user, with the parking lot ID of the parking lot used for parking of the vehicle 10 of the service user. In this embodiment, the processor 411 registers the correspondence relationship among the user ID, substitute ID, and parking lot ID, in the substitute DB 417. However, the correspondence relationship may be registered in the user DB 416 or the parking lot DB 418. The processor 411 sends a command for substitute driving of the vehicle 10, to the substitute terminal 200B, using the substitute terminal information corresponding to the substitute ID (<4> in FIG. 1).

At this time, the processor 411 obtains corresponding user information from the user DB 416, using the user ID retrieved from the substitute DB 417 using the substitute ID, and obtains corresponding parking lot information from the parking lot DB 418, using the parking lot ID retrieved from the substitute DB 417 using the substitute ID. The substitute driving command includes user information (the user name, contact information, vehicle information, key unit information, the date and time of use, delivery location) corresponding to the user ID linked with the substitute driver ID, and parking information corresponding to the parking lot ID. The substitute driver can go to the delivery location, and receive authentication information issued, using the user information in the substitute driving command received by the substitute terminal 200B. Also, the substitute driver can drive the vehicle 10 to the parking lot, in place of the user, using the parking lot information received by the substitute terminal 200B. For example, the substitute driver can set the parking lot indicated by the parking lot information, as a destination of a car navigation system included in the substitute terminal 200B or the vehicle 10, and drive the vehicle 10 according to a command from the car navigation system, so as to move the vehicle 10 to the parking lot.

While the parking lot selection conditions and the path selection conditions are used in the example of the process shown in FIG. 10, the parking lot selection conditions may not be used (set to OFF) or may be omitted. In this case, step S33 and subsequent steps are executed, with respect to a given number of parking lots picked out from a list according to a predetermined rule. For example, parking lots located within a circle of a given radius from the delivery location are picked out.

In the example of the process shown in FIG. 10, when there is a path that satisfies the parking lot selection conditions and the path selection conditions in step S34, the path information is not transmitted to the user terminal 200A. However, when an affirmative decision (YES) is obtained in step S34, the path information indicating the path that satisfies the parking lot selection conditions and the path selection conditions may be transmitted from the management system 400 to the user terminal 200A, and the management system 400 may receive information indicating confirmation from the user terminal 200A.

Example of Operation in Manual Selection Mode

Figure 12:
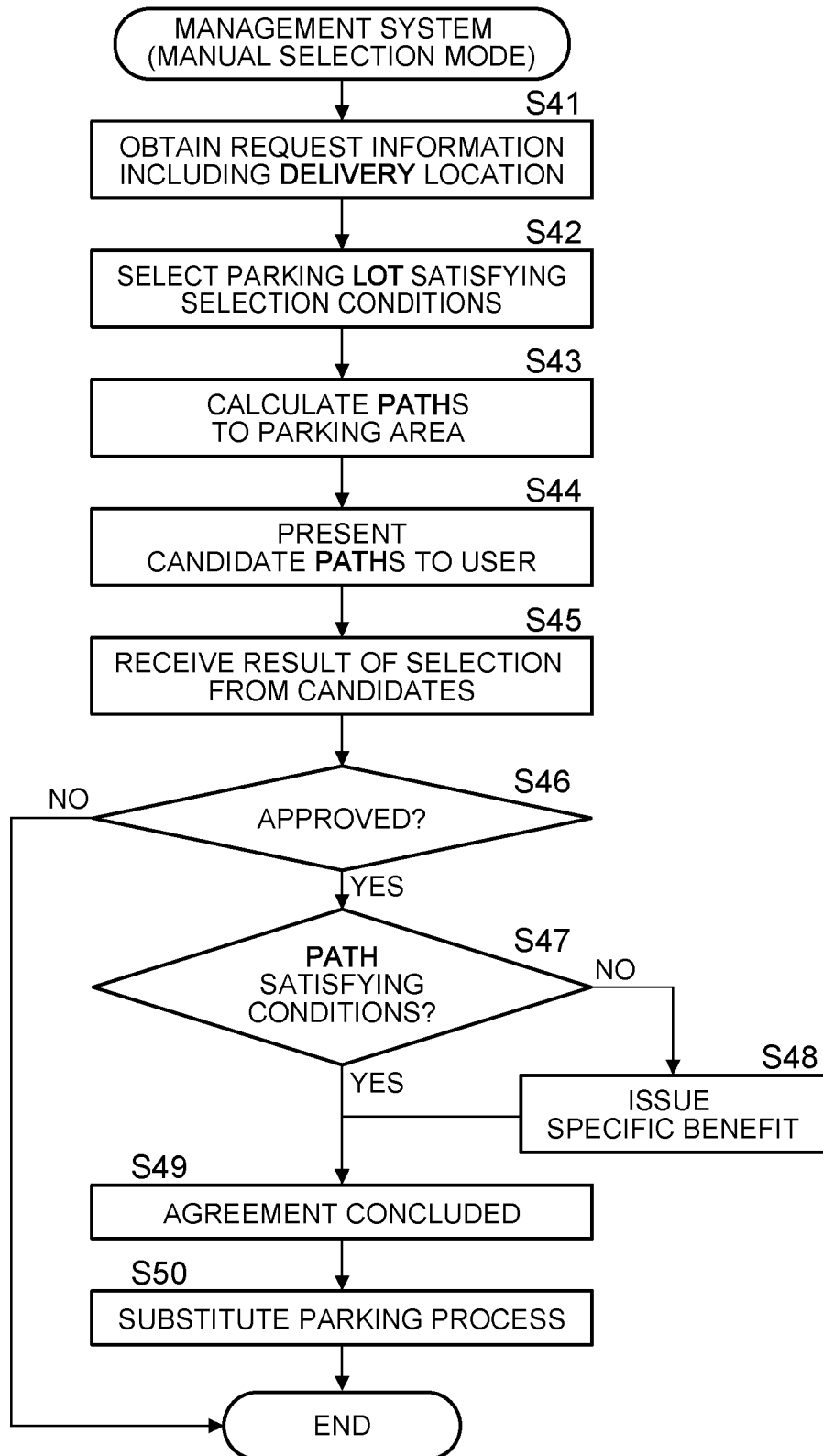
FIG. 12 is a flowchart illustrating an example of a process (in manual selection mode) performed by the management system.

FIG. 12 shows the flow of processing of the management system 400 from a request for use of substitute parking service to a substitute parking process (output of a substitute driving command), in the manual selection mode. Steps S41 to S43 in FIG. 12 are substantially identical with steps S31 to S33 shown in FIG. 10, and therefore, will not be described. However, in step S43, a given number of paths are picked out, irrespective of whether the parking lot selection conditions are satisfied. For example, with regard to two or more paths between the delivery location and one parking lot, a path having the shortest distance as a path corresponding to "distance prioritized", and a path having the cheapest parking fee as a path corresponding to "parking fee prioritized", are picked out as two or more candidate paths. In another example, two or more paths selected according to the parking lot selection conditions, path selection conditions, etc. from a plurality of paths between the delivery location and each of two or more parking lots may be picked out as two or more candidate paths.

In step S44, the processor 411 of the management system 400 sends path information indicating the two or more paths picked out in step S43, from the communication IF 413 to the user terminal 200A. The path information includes information indicating at least one of the distance of each candidate path indicated in the path information, parking fee, and the amount of energy consumption. The path information may also include information to the effect that the path does not satisfy at least one of the parking lot selection conditions and path selection conditions when at least one of the conditions is not satisfied.

Upon receipt of the path information, the processor 21 of the user terminal 200A displays a screen based on the path information, on the display 25. On the screen based on the path information, each candidate path from the delivery location to the parking lot, information on the parking lot, and information to the effect that one or both of the parking lot selection conditions and the path selection conditions is/are not satisfied, are displayed. The path may be displayed in the form of letters, or an image or video showing the path on a map, or a combination thereof. The service user selects non-approval of all of the paths, or selects one of the two or more paths, and enters approval of the selected path, using the input device 24. The response including information indicating approval or non-approval of the path is transmitted from the user terminal 200A to the management system 400, and received by the management system 400 (step S45).

In step S46, the processor 411 of the management system 400 determines whether the response includes information indicating non-approval of the routes. When the processor 411 determines that the response includes information indicating non-approval, the agreement on the substitute parking service is not concluded, and the process ends. When the response does not include the information of non-approval, the processor 411 proceeds to step S47.

In step S47, the processor 411 determines whether the path selected and approved by the service user satisfies both the parking lot selection conditions and path selection conditions set by the service user. When the processor 411 determines that both of the conditions are satisfied, it proceeds to step S49. If not, the processor 411 proceeds to step S48. Step S48 is identical with step S37 of FIG. 10, and steps S49 and S50 are identical with steps S38 and S39; therefore, these steps will not be described. Step S48 is optional. When transmission of the substitute driving command is completed, the management system 400 sends a notification that the vehicle 10 is to be stopped at the delivery location at the date and time of use, to the service user, for example, and finishes the process.

Processing on Substitute Terminal

When the substitute terminal 200B receives the user information, the substitute driver is informed that he/she has been selected as the substitute driver of the vehicle 10, and moves to the delivery location of the vehicle 10. The substitute driver may move on foot, or may use a vehicle (including a two-wheel vehicle, and a bicycle) for moving, or other moving means. The vehicle of the substitute driver may be driven by himself/herself, or may be driven by a fellow passenger. For example, it is preferable that the substitute driver goes to the delivery location, along with a companion, by a vehicle for moving, and has the companion drive the vehicle and pick up the substitute driver, after the substitute driver parks the vehicle 10 in place of the service user. The substitute driver may cause the substitute terminal 200B to receive the position of the vehicle 10 which the management system 400 receives from the user terminal 200A, and head for the delivery location, using the position of the vehicle 10 as a hint.

When the substitute driver finds the vehicle 10 at the delivery location, the substitute driver operates the substitute terminal 200B to send a request for issuance of authentication information to the management system 400 (<5> in FIG. 1). The substitute terminal 200B can obtain the address of the management system 400, through learning of a source address of the substitute driving command. Alternatively, the management system 400 may designate a delivery address of a request for issuance of authentication information.

When the management system 400 receives the request for issuance, it refers to key unit information of the service user, in the user DB 416, obtains authentication information (stored in advance in the storage device 412, for example) corresponding to the key unit information, and sends the authentication information to the substitute terminal 200B (<5> in FIG. 1). The wireless communication circuit 23 of the substitute terminal 200B receives authentication information as enablement data from the management system 400, via the network 1. The processor 21 of the substitute terminal 200B sends the authentication information received from the management system 400, to the key unit 100 (vehicle-mounted unit), so that the key unit 100 behaves like an electronic key. As a result, the door of the vehicle 10 is unlocked, and the engine is started when an engine start button provided in the vehicle 10 is pushed. Namely, the vehicle 10 is brought into an operable state in which the vehicle 10 can be driven.

The substitute driver opens the door of the vehicle 10, and starts the engine, to head for a destination (the parking lot of the vehicle 10) by driving the vehicle 10. After stopping the vehicle 10 in the parking lot, the substitute driver comes out of the vehicle 10, and performs a predetermined disablement process. Through the disablement process, the key unit 100 stops behaving like the electronic key, and the vehicle 10 ceases to be in the operable state, and is locked. As a result, the substitute driver becomes unable to unlock the vehicle 10 again and drive the vehicle 10.

In the above description, the substitute terminal 200B sends the request for issuance of authentication information after the substitute driver arrives at the delivery location. However, the substitute terminal 200B may send the request for issuance at an appropriate time after receiving the substitute driving command, and receive the authentication information. Also, in this embodiment, the management device 400 waits for receipt of the request for issuance, and then sends the authentication information to the substitute terminal 200B; however, it may be considered to omit the step of receiving the request for issuance, and send the authentication information along with the substitute driving command.

In operation of the management system 400 as described above, the processor 411 operates as a means for generating path information, means for issuing a specific benefit, and means for selecting a parking lot. Also, the communication IF 413 operates as a means for communicating with the user terminal 200A and the substitute terminal 200B, and the processor 411 and the communication IF 413 operate as a transmitting means for transmitting the path information to the user terminal 200A.

Locking/Unlocking System Including Key Unit

Figure 13:
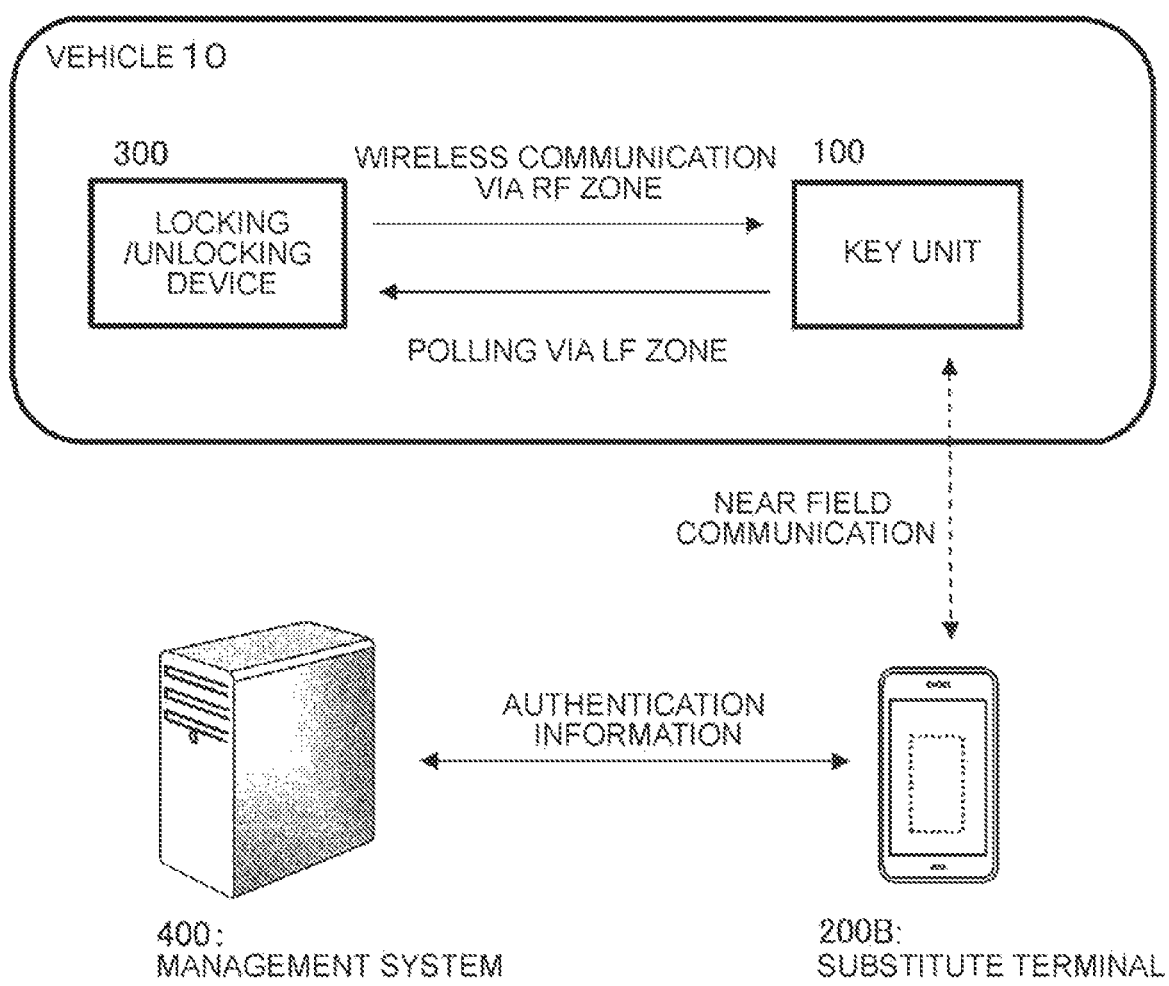
FIG. 13 schematically shows the configuration of a locking/unlocking system including a key unit.

Here, one example of a locking/unlocking system including the key unit 100 that performs locking/unlocking of the vehicle 10 will be described, using FIG. 13 and FIG. 14. As shown in FIG. 13, the locking/unlocking system includes the key unit 100 and locking/unlocking device 300 installed on the vehicle 10, substitute terminal 200B, and management system 400. In the locking/unlocking system, the key unit 100 has a wireless interface similar to an electronic key (mobile device) of a smart key system, and communicates with the existing locking/unlocking device 300, so as to lock and unlock the vehicle 10 without using a physical key. The key unit 100 also performs near field communication with the substitute terminal 200B, and determines whether the key unit 100 behaves like the electronic key of the vehicle 10, based on the result of authentication of the substitute terminal 200B. The substitute driver can lock and unlock the vehicle 10, by operating the substitute terminal 200B from the outside of the vehicle 10.

System Configuration

Figure 14:
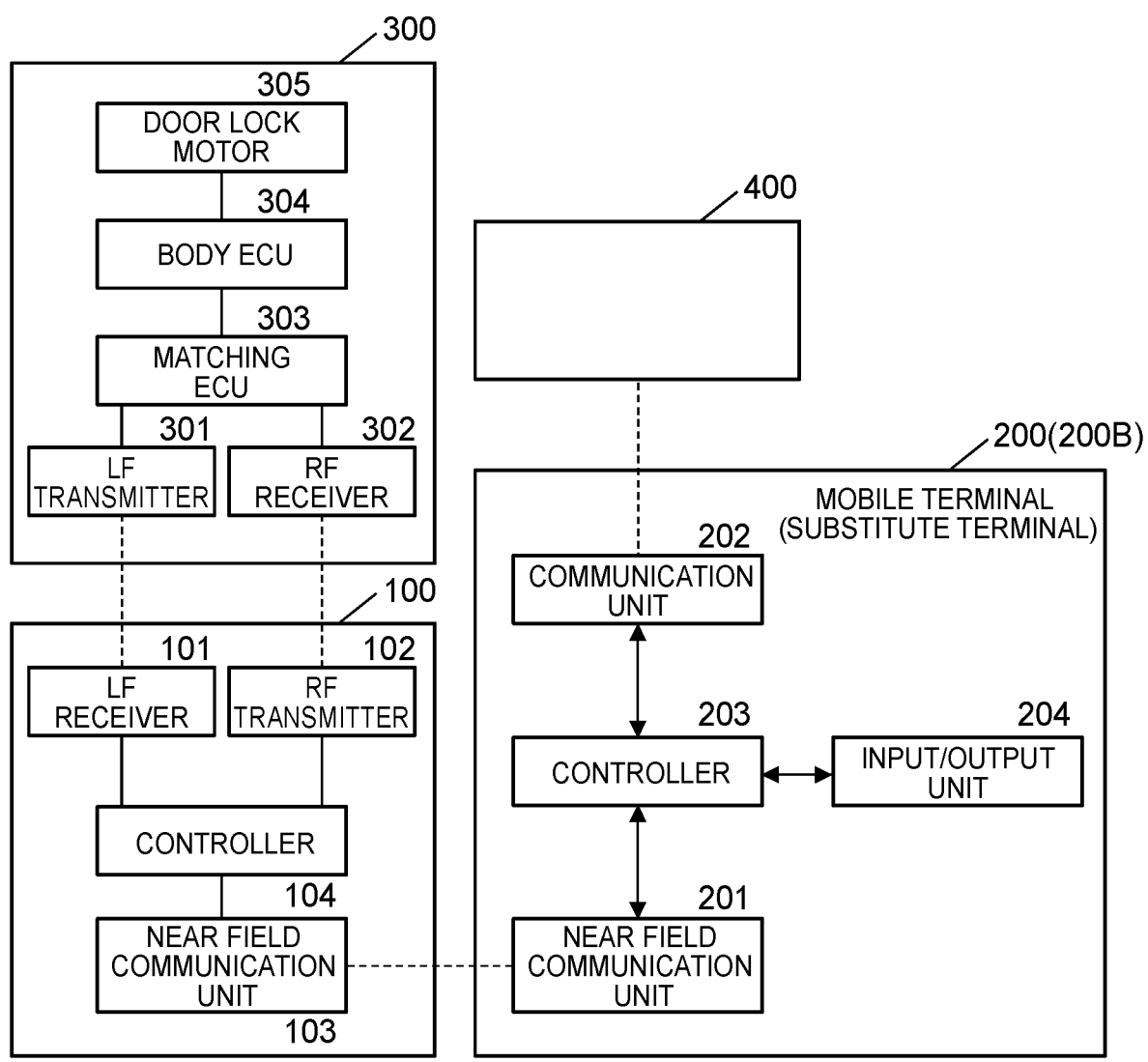
FIG. 14 schematically shows one example of the configuration of the key unit, mobile terminal, locking/unlocking device, and server device.

In FIG. 14, the locking/unlocking device 300 locks and unlocks the door of the vehicle 10, in response to a locking signal and an unlocking signal transmitted via radio waves of a high-frequency (radio-frequency, which will be called "RF") zone, from an electronic key (which will be called "mobile device") carried by the user (service user) of the vehicle 10. The locking/unlocking device 300 also has a function of transmitting radio waves of a low-frequency (which will be called "LF") zone, so as to search for the mobile device. The key unit 100 sends and receives radio waves of the RF zone and LF zone to and from the locking/unlocking device 300, in place of the mobile device carried by the user, so as to control locking and unlocking of the door of the vehicle 10.

The locking/unlocking device 300 includes an LF transmitter 301, RF receiver 302, matching electronic control unit (ECU) 303, body electronic control unit (ECU) 304, and door lock actuator 305. The LF transmitter 301 transmits radio waves of a low-frequency zone (e.g., 100 KHz to 300 KHz) for searching for (polling) the key unit 100. The LF transmitter 301 is incorporated in the vicinity of the center console or steering wheel in the cabin, for example. The RF receiver 302 receives radio waves of a high-frequency zone (e.g., 100 MHz to 1 GHz) transmitted from the key unit 100. The RF receiver 302 is placed at any location within the cabin.

The matching ECU 303 performs control to lock and unlock the door of the vehicle 10, based on a signal (locking signal or unlocking signal) transmitted from the key unit 100 via radio waves of the RF zone. The matching ECU 303 is provided by a microcomputer, for example. In the following description, the locking signal and the unlocking signal will be collectively called "locking/unlocking signal". The term "locking/unlocking signal" represents at least one of the locking signal and the unlocking signal.

The matching ECU 303 certifies that the locking/unlocking signal transmitted from the key unit 100 was transmitted from a proper device. More specifically, the matching ECU 303 determines whether a key ID included in the locking/unlocking signal coincides with a key ID stored in advance in a storage unit of the matching ECU 303. Then, the matching ECU 303 sends an unlocking command or a locking command to the body ECU 304, based on the result of this determination. The unlocking command or locking command is transmitted via an in-vehicle network, such as CAN (Controller Area Network).

The body ECU 304 is a computer that controls the body of the vehicle 10. The body ECU 304 unlocks and locks the vehicle 10, by controlling the door lock motor 305 based on the unlocking command or locking command received from the matching ECU 303. The door lock motor 305 is an actuator that locks and unlocks the door (including a trunk, as well as a door for boarding and a rear gate) of the vehicle 10. The door lock motor 305 operates based on a signal from the body ECU 304.

The key unit 100 authenticates the substitute terminal 200B by conducting near field communication with the substitute terminal 200B, and sends the locking/unlocking signal, using radio waves of the RF zone, based on the result of the authentication. As one example, the key unit 100 includes an LF receiver 101, RF transmitter 102, near field communication unit 103, and controller 104. The LF receiver 101 receives a polling signal transmitted via radio waves of the LF zone, from the locking/unlocking device 300. The LF receiver 101 has an antenna (which will be called "LF antenna") for receiving the radio waves of the LF zone. The RF transmitter 102 sends the locking/unlocking signal to the locking/unlocking device 300, via radio waves of the RF zone.

The near field communication unit 103 communicates with the substitute terminal 200B. The near field communication unit 103 conducts communications in a short range or distance (to an extent that permits communications between the inside of the cabin and the outside of the cabin), using a certain wireless communication standard. As one example the near field communication unit 103 performs data communications based on the BLE. The BLE is a low energy communication standard using the Bluetooth (registered trademark), and is characterized in that one device can immediately start communicating with the other device upon detection of the other device, without requiring pairing of the two devices.

The controller 104 performs control to authenticate the substitute terminal 200B, by conducting near field communication with the substitute terminal 200B via the near field communication unit 103, and performs control to send the locking/unlocking signal based on the result of the authentication. The controller 104 includes a processor and a memory, for example, and the processor executes control programs stored in the memory for controlling the key unit 100, so as to implement various functions. For example, the controller 104 has a function of receiving a polling signal transmitted as radio waves of the LF zone from the locking/unlocking device 300, via the LF receiver 101, a function of sending the locking/unlocking signal in the form of radio waves of the RF zone to the locking/unlocking device 300, via the RF transmitter 102, a function of processing communications with the substitute terminal 200B conducted via the near field communication unit 103, a function of producing the locking/unlocking signal when the substitute terminal 200B is successfully authenticated, and so forth.

The controller 104 performs operation to authenticate the substitute terminal 200B, based on authentication information included in a locking request or unlocking request (which will be collectively called "locking/unlocking request") transmitted from the substitute terminal 200B. The controller 104 compares authentication information stored in the memory, with the authentication information transmitted from the substitute terminal 200B, and determines that the substitute terminal 200B is successfully authenticated when these pieces of information have a predetermined relationship. When the predetermined relationship is not recognized, the controller 104 determines that the authentication failed. When the substitute terminal 200B is successfully authenticated, a locking/unlocking signal produced according to the request received from the substitute terminal 200B is transmitted to the locking/unlocking device 300 via the RF transmitter 102. The authentication method may be a method by which the identity is checked by simply comparing the two pieces of authentication information with each other, or may be a method using asymmetric cipher. In the following description, the authentication information stored in the key unit 100 will be called "device authentication information", and the authentication information transmitted from the substitute terminal 200B will be simply called "authentication information", where appropriate.

The key unit 100 transmits an ID of the electronic key (which will be called "key ID"), along with the locking/unlocking signal, to the locking/unlocking device 300. The key ID may be stored in advance in the form of plain text in the key unit 100, or may be stored in an encrypted form.

The substitute terminal 200B will be described. The substitute terminal 200B functions as a device that performs processing or operation as a near field communication unit 201, communication unit 202, controller 203, and input/output unit 204, when the processor 21 is loaded with programs stored in the storage device 22 and executes the programs. The near field communication unit 201, which corresponds to the near field communication circuit 27, communicates with the key unit 100, according to the same communication standard as that of the near field communication unit 103. The communication unit 202, which corresponds to the wireless communication circuit 23, connects the substitute terminal 200B to the network 1, and governs communications with the management system 400, etc. The communication unit 202 communicates with other devices (such as the management system 400) via the network 1, using mobile communication service, such as 3G (3rd Generation), or LTE (Long Term Evolution).

The controller 203, which corresponds to the processor 21, performs operation to produce a locking/unlocking request, operation to obtain the authentication information, and operation to send the locking/unlocking request and the authentication information to the key unit 100, for example. The controller 203 also performs operation to rewrite control programs stored in the memory of the key unit 100, as will be described later, in addition to the above operations. The controller 203 interacts with the substitute driver via the input/output unit 204. The input/output unit 204, which corresponds to the input device 24 and the display 25, accepts input operation performed by the substitute driver, and presents information to the user.

The controller 203 displays an operation screen on the input/output unit 204, and produces an unlocking request or a locking request, according to operation performed by the substitute driver. For example, the controller 203 outputs an icon for unlocking, icon for locking, or the like, on a touch panel display, and produces an unlocking request or a locking request, based on operation performed by the substitute driver. The operation performed by the substitute driver is not limited to the one via the touch panel display, but may be performed via a hardware switch, or the like, for example.

The controller 203 performs operation to obtain authentication information from the management system 400. The authentication information is not the information with which the locking/unlocking device 300 authenticates the key unit 100, but information with which the key unit 100 authenticates the substitute terminal 200B. More specifically, the controller 203 sends a signal requesting issuance of authentication information, along with information that identifies the substitute terminal 200B, to the management system 400, via the communication unit 202. The management 400 that receives this signal obtains authentication information unique to the substitute terminal 200B, and sends the obtained authentication information to the substitute terminal 200B. As a result, it becomes possible to perform operation to unlock the vehicle 10, on the substitute terminal 200B. When the substitute terminal 200B does not have the authentication information, it is impossible to perform locking operation and unlocking operation on the operation screen. The authentication information obtained by the substitute terminal 200B may be a permanent key, or a one-time key. In either case, the device authentication information corresponding to the authentication information is stored in advance in the key unit 100.

Invalidation of Authentication Information

The state in which the substitute driver is permitted to operate the vehicle 10 is cancelled in the following manner. For example, the management device 400 invalidates authentication information issued by the substitute terminal 200B. The content of a specific process of invalidating the authentication information is not particularly limited, provided that the substitute driver can be inhibited from operating the vehicle 10 again after completing parking, by use of the substitute terminal 200B.

To invalidate the authentication information, the management system 400 performs any of operations (1) to (7) below. However, methods of invalidation other than those as described below may be employed, provided that the substitute driver is inhibited from unlocking the door or driving again, after completing substitute parking of the vehicle. (1) A command to delete the authentication information is given to the substitute terminal 200B. (2) A command to set an invalidation flag of authentication information to ON is given to the substitute terminal 200B. In this case, while the invalidation flag is ON, the substitute terminal 200B is placed in a state where it does not send authentication information. (3) A command to rewrite the period of validity of the authentication information to expire on some date and time in the past is given to the substitute terminal 200B. The substitute terminal 200B deletes the authentication information that has passed the period of validity. (4) A fact that the authentication information is invalid and a command to inhibit transmission of the invalid authentication information are given to the substitute terminal 200B. (5) The management system 400 communicates with the key unit 100, and gives a command to inhibit the key unit 100 from accepting invalid authentication information, to the key unit 100. (6) The management system 400 communicates with the key unit 100, and gives a command to inhibit the vehicle 10 from accepting authentication information from the substitute terminal 200B, to the key unit 100. (7) It may be considered to manually delete the authentication information from the substitute terminal 200B, without requiring the management system 400 to communicate with other devices.

First Modified Example of Locking/Unlocking System

In the above example of the locking/unlocking system, when the authorization process is successfully performed in the key unit 100, the vehicle 10 is unlocked by the locking/unlocking device 300. Instead, the process performed in the key unit 100 may be carried out in the locking/unlocking device 300. Namely, the locking/unlocking device 300 may include a control unit (ECU) for authenticating the authentication information received from the substitute terminal 200B, and the control unit may send an unlocking command or locking command to the body ECU 304, via an in-vehicle network, such as CAN, when the substitute terminal 200B is successfully authenticated. In this manner, the substitute driver can bring the vehicle 10 into an operable state, with a single arrangement that does not include the key unit 100.

Second Modified Example of Locking/Unlocking System

In the above example of the locking/unlocking system, the substitute terminal 200B receives authentication information as enablement data of the vehicle 10, from the management system 400. When the substitute terminal 200B is authenticated based on the authentication information, the locking/unlocking signal is transmitted from the key unit 100 to the locking/unlocking device 300, and the vehicle 10 is locked or unlocked. The authentication information may not be information for authenticating the substitute terminal 200B, but may include information of the key ID for locking or unlocking the vehicle 10. In this case, the substitute terminal 200B receives authentication information including the key ID from the management system 400, and sends the received key ID, along with the locking/unlocking signal, to the locking/unlocking device 300. The locking/unlocking device 300 checks the received key ID against the key ID stored in advance in the locking/unlocking device 300, and locks or unlocks the vehicle 10 when the key IDs match each other. The key ID may be sent and received in an encrypted form, between the substitute terminal 200B, and the management system 400 or the locking/unlocking device 300. The management system 400 may produce a one-time key, by encrypting or encoding the key ID along with time information according to a predetermined algorithm. The locking/unlocking device 300 may decrypt the received one-time key, by a method corresponding to the same predetermined algorithm as that used by the management system 400, and check it against the key ID stored in advance in the locking/unlocking device 300. The one-time key may also be transmitted from the management system 400 to a lending management server (not shown), and transmitted from the lending management server to the substitute terminal 200B. In any case, the substitute terminal 200B achieves invalidation, by deleting the one-time key upon a lapse of a predetermined time from receipt of the one-time key. With the one-time key produced from the key ID and time information thus included in the authentication information, the management system 400 can produce temporarily valid authentication information, for each event of substitute parking, and send it to the substitute terminal 200B.

Third Modified Example of Locking/Unlocking System

In the above example of the locking/unlocking system, the management system 400 may send authentication information for the substitute terminal 200B corresponding to fixed authentication information unique to the key unit 100, to the substitute terminal 200B, and may send the key ID stored in advance in the locking/unlocking device 300 of the vehicle 10, to the substitute terminal 200B. However, the management system 400 may produce new authentication information and issue it to the substitute terminal 200B, each time the management system 400 receives a request for authentication information, from the substitute terminal 200B. In this case, the management system 400 may store device authentication information for the key unit 100 corresponding to the new authentication information for the substitute terminal 200B, in the key unit 100, via a vehicle-mounted communication device (not shown) that can communication with the network 1 to which the substrate terminal 200B is connected. In this case, the key unit 100 may be connected to the vehicle-mounted communication device via the CAN, or the like. However, the management system 400 may produce new authentication information, based on identification information used for identifying the vehicle 10, and time information, and pass the new authentication information and the time information to the substitute terminal 200B. In this case, the key unit 100 may produce new authentication information, by a method corresponding to the same algorithm as that of the management system 400. The substitute terminal 200B may send the new authentication information and the time information to the key unit 100, so as to be authenticated.

Unloading from Parking Lot

The service user goes to the parking lot where the vehicle 10 is parked by the substitute driver, and picks up the vehicle 10 by unloading the vehicle 10 from the parking lot. Regarding unloading from the parking lot, (a) the service user pays for the parking fee in some cases, and (b) the service provider pays for the parking fee in other cases. When the service user pays for the parking fee, the service user may go to the parking lot, pay for the parking fee, and unload the vehicle 10 from the parking lot. On the other hand, when the service provider pays for the parking fee, operation as described below may be considered. For example, an automated parking fee machine provided in a parking lot is caused to read a predetermined code. The predetermined code is, for example, a code representing the service provider. The predetermined code may be held in an IC card provided from the service provider to the service user, or the user terminal 200A may download the predetermined code from the management system 400, for example. The predetermined code is linked with the parking fee, and the operator of the parking lot collects the parking fee from the service provider.

As an optional service, service involving operation to unload the vehicle 10, and substitute driving to a location desired by the service user, may be implemented. In this case, the authentication information held by the substitute terminal 200B may be used again, without being invalidated. In another example, the substitute terminal 200B may send a request for issuance again, and obtain authentication information again from the management system 400.

Effects of Embodiment

According to the illustrated embodiment, path information indicating a path scheduled to be used for movement from the delivery location of the vehicle 10 to the parking lot is transmitted from the management system 400 to the user terminal 200A. The user terminal 200A displays the path information obtained from the management system 400 on the display 25, so as to present the path information to the service user. Thus, the service user can refer to the information on the path scheduled to be used for movement of the vehicle 10. As a result, the service user, when using the substitute parking service, is less likely or unlikely to feel concerned about the path used by the substitute driver for movement of the vehicle 10, and the amount of energy consumption (fuel consumption) required for movement, and reassurance can be given to the service user. With reassurance thus provided, the service user can more easily make a decision on the agreement. Also, in making the agreement, it may be possible to give further reassurance to the service user, by promising that a record of the path actually used will be provided to the service user. For example, the management system 400 may obtain position information of the substitute terminal 200B, and record a movement path of the vehicle 10 during movement to the parking lot, or record an image or video using the substitute terminal 200B. After the use of the service, the management system 400 may provide the record of the path to the service user, and prove that the vehicle 10 moved along the path agreed by the service user. It may also be possible to provide path information to the service user after concluding the agreement. In this case, too, reassurance can be given to the service user.

According to the embodiment, when the path satisfies the parking lot selection conditions and path selection conditions which the service user provided in advance to the management system 400, the agreement is concluded without requiring transmission of the path information. Thus, the path having the content permitted or desired by the service user is selected, while the procedure can be simplified by omitting provision of the path information.

According to the embodiment, when the service user gives approval to a path that does not satisfy (meet) the parking lot selection conditions and path selection conditions, a specific benefit is granted to the service user, so that complaint of the service user can be reduced.

According to the embodiment, the vehicle 10 is parked in the parking lot having the specifications desired by the service user, under the parking lot selection conditions, so that the service user can more easily pick up (unload) the vehicle 10, resulting in enhancement in the sense of satisfaction of the service user. Also, the service user is provided with information, such as the distance to the parking lot, parking fee, and the amount of energy consumption, as well as a single or two or more candidate paths, so that the service user can be informed of details of the service. The service user can also select his/her own desired path, based on these details, and give approval to the path. These arrangements also contribute to enhancement in the sense of satisfaction of the service user.

Modified Example of Management System

Figure 15:
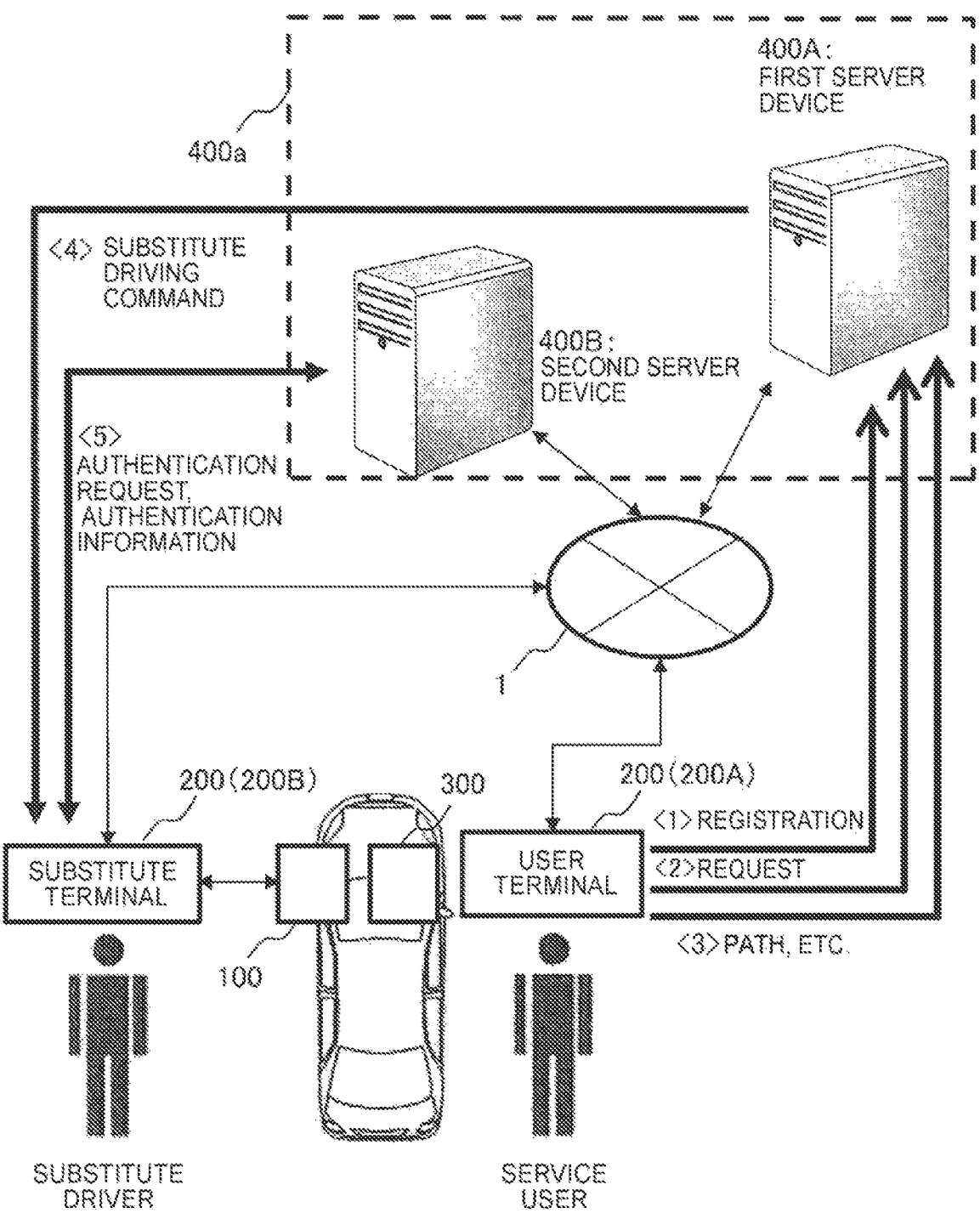
FIG. 15 shows a modified example of the management system.

FIG. 15 shows a modified example of the management system 400 shown in FIG. 1. A management system 400a shown in FIG. 15 includes a first server device 400A and a second server device 400B. The first server device 400A operates as a device for managing substitute parking service, as one of operations performed by the management system 400. The second server device 400B operates as a device for issuing authentication information, as one of operations performed by the management system 400.

In <4> of FIG. 15, the first server device 400A generates a substitute driving command to be transmitted to the substitute terminal 200B, such that the substitute driving command includes information indicating a method of accessing the second server device 400B, for example, an address of the second server device 400B. The substitute terminal 200B sends a request for issuance of authentication information, to the second server device 400B, using the address of the second server device 400B. The second server device 400B issues the authentication information in response to the request for issuance, and sends the information to the substitute terminal 200B (<5> in FIG. 15).

According to the modified example of the management system, the operations of the management system 400 are distributed to the first server device 400A and the second server device 400B, without burdening the service user and the substitute driver, so that load distribution between management of service users and management of authentication information can be achieved. Also, since the user terminal 200A does not access the second server device 400B having authentication information, different security levels can be employed for the first server device 400A and the second server device 400B. For example, it may be considered to set the security level of the first server 400A to be lower than that of the second server device 400B, so as to reduce processing and time required for communicating with the user terminal 200A.

In the illustrated embodiment, the key unit 100 is arranged to behave like an electronic key, using the substitute terminal 200B. However, the substitute parking service according to the above embodiment may be implemented even when the vehicle of the service user is not installed with the key unit 100. In this case, the vehicle (physical key) may be directly handed over between the service user and the substitute driver. The arrangements according to the embodiment as described above may be combined as appropriate.

What is claimed is:

1. A management system of substitute parking service that manages substitute parking service in which a substitute driver parks a vehicle of a service user, in place of the service user, the management system comprising:
a processor configured to:
generate, based on (i) delivery location information indicating a delivery location at which the vehicle is delivered to the substitute driver and (ii) parking lot information indicating a position of a parking lot in which the vehicle is allowed to be parked, path information indicating a path along which the vehicle to be traveled from the delivery location of the vehicle to the parking lot,
transmit the path information to a terminal of the service user, and
receive, from the terminal, information indicating whether the path information sent to the terminal is approved by the service user.

2. The management system of substitute parking service according to claim 1, wherein the path information is transmitted when the path indicated by the path information does not satisfy a path selection condition set by the service user.

3. The management system of substitute parking service according to claim 2, wherein the path selection condition includes a distance from the delivery location to the parking lot, the distance being acceptable to the service user.

4. The management system of substitute parking service according to claim 2, wherein the path selection condition includes an amount of energy consumption of the vehicle required for the vehicle to travel from the delivery location to the parking lot, the amount of energy consumption being acceptable to the service user.

5. The management system of substitute parking service according to claim 2, wherein the processor is configured to issue a specific benefit to the service user, when an approval of the path that does not satisfy the path selection condition is received from the terminal of the service user.

6. The management system of substitute parking service according to claim 1, wherein the processor is configured to select the parking which the vehicle is allowed to be parked from a plurality of parking lots in which the vehicle is allowed to be parked, the selected parking lot satisfying a parking lot selection condition set by the service user, and
wherein the processor is configured to use information indicating a position of the parking lot selected by the processor, as the parking lot information indicating the position of the parking lot, to generate the path information.

7. The management system of substitute parking service according to claim 6, wherein the parking lot selection condition includes specifications of the parking lot desired by the service user.

8. The management system of substitute parking service according to claim 1, wherein the path information generated by the processor is candidate path information indicating a plurality of candidate paths from the delivery location to the parking lot,
wherein processor is configured to send the candidate path information and cost information indicating a cost involved in each of the plurality of candidate paths, to the terminal of the service user, and
wherein the processor is configured to receive path information indicating a path selected by the service user from the plurality of candidate paths.

9. The management system of substitute parking service according to claim 8, wherein the cost information includes information indicating a distance from the delivery location to the parking lot, along each of the plurality of candidate paths.

10. The management system of substitute parking service according to claim 8, wherein the cost information includes information indicating a parking fee involved in each of the plurality of candidate paths.

11. The management system of substitute parking service according to claim 8, wherein the cost information indicating the cost includes information indicating an amount of energy consumption required for the vehicle to travel from the delivery location to the parking lot, along each of the plurality of candidate paths.

12. A method of assisting use of substitute parking service in which a substitute driver parks a vehicle of a service user, in place of the service user, the method comprising:
generating path information indicating a path along which the vehicle to be traveled from a delivery location at which the vehicle is delivered to the substitute driver to a parking lot in which the vehicle is allowed to be parked based on (i) delivery location information indicating the delivery location and (ii) parking lot information indicating a position of the parking lot;

transmitting the path information to a terminal of the service user; and receiving, from the terminal, information indicating whether the path information sent to the terminal is approved by the service user.

13. A non-transitory computer-readable storage medium storing a management program for use in a computer of a system that manages substitute parking service in which a substitute driver parks a vehicle of a service user, in place of the service user, the management program causing the computer to execute the steps of:

generating path information indicating a path along which the vehicle to be traveled from a delivery location at which the vehicle is delivered to the substitute driver to a parking lot in which the vehicle is allowed to be parked based on (i) delivery location information indicating the delivery location and (ii) parking lot information indicating a position of the parking lot;

transmitting the path information to a terminal of the service user; and receiving, from the terminal, information indicating whether the path information sent to the terminal is approved by the service user.

14. A non-transitory computer-readable storage medium storing a management program for use in a computer of a terminal of a service user who uses substitute parking service in which a substitute driver parks a vehicle of the service user, in place of the service user, the management program causing the computer to execute the steps of:

obtaining path information indicating a path along which the vehicle to be traveled from a delivery location at which the vehicle is delivered to the substitute driver to a parking lot in which the vehicle is allowed to be parked from a management system that manages the substitute parking service;

presenting the path information to the service user; and transmit, to the management system, information indicating whether the obtained path information is approved by the service user.

15. A method of assisting use of substitute parking service in which a substitute driver parks a vehicle of a service user, in place of the service user, the method comprising:

causing a terminal of the service user to obtain path information indicating a path along which the vehicle to be traveled from a delivery location at which the vehicle is delivered to the substitute driver to a parking lot in which the vehicle is allowed to be parked from a management system that manages the substitute parking service;

presenting the path information to the service user; and transmit, to the management system, information indicating whether the obtained path information is approved by the service user.

\* \* \* \* \*